(12) United States Patent
Kurimura et al.

(10) Patent No.: US 7,048,444 B2
(45) Date of Patent: May 23, 2006

(54) FLUID LUBRICATED BEARING DEVICE

(75) Inventors: Tetsuya Kurimura, Kuwana (JP);
Yasuhiro Yamamoto, Kuwana (JP);
Tatsuo Kawase, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/294,483

(22) Filed: Nov. 13, 2002

(65) Prior Publication Data

US 2003/0091249 A1 May 15, 2003

(30) Foreign Application Priority Data

Nov. 13, 2001 (JP) .............................. 2001-347725
Feb. 6, 2002 (JP) .............................. 2002-029520
Feb. 13, 2002 (JP) .............................. 2002-035790
Sep. 26, 2002 (JP) .............................. 2002-281599

(51) Int. Cl.
*F16C 17/10* (2006.01)

(52) U.S. Cl. ..................................................... 384/119
(58) Field of Classification Search ................ 384/107, 384/112, 113, 115, 119, 100
See application file for complete search history.

(56) References Cited

U.S. PATENT DOCUMENTS 6,250,807 B1 * 6/2001 Mori et al. .................. 384/107
6,655,841 B1 * 12/2003 Heine et al. ................. 384/110

\* cited by examiner

*Primary Examiner*—Lenard A. Footland
(74) *Attorney, Agent, or Firm*—J.C. Patents

(57) ABSTRACT

An inner space of a housing sealed with a seal member as well as internal pores of a bearing member (pores in a porous structure) are filled with a lubricating oil without the presence of air, so that the oil surface of the lubricating oil is within a seal space. Under a reduced pressure of 100 Torr, no lubricating oil leaks outside of the housing even at any attitude of the fluid lubricated bearing device such as normal, inverted, or horizontal attitude.

3 Claims, 17 Drawing Sheets

FIG. 16

Check for lubricating oil leakage under reduced pressures

| | Degree of vacuum in vacuum chamber Torr | Remaining air* vol% | Bearing device attitude | | | Evaluation |
|---|---|---|---|---|---|---|
| | | | Normal | Horizontal | Inverted | |
| Example 1 | 0.1 | 0.01 | Not applicable | Not applicable | Not applicable | ○ |
| Example 2 | 0.4 | 0.05 | Not applicable | Not applicable | Not applicable | ○ |
| Comparative example 1 | 1.0 | 1.32 | Applicable | Applicable | Applicable | × |
| Comparative example 2 | 150.0 | 19.74 | Not applicable | Applicable | Applicable | × |
| Comparative example 3 | 300.0 | 39.47 | Not applicable | Applicable | Applicable | × |

*A value of the amount of remaining air to the volume of the housing inner space, estimated in accordance with the degree of vacuum.

FIG. 17

Check for lubricating oil leakage in an actual motor during ON/OFF operations

| | Degree of vacuum in vacuum chamber Torr | Remaining air* vol% | Motor attitude | | | Evaluation |
|---|---|---|---|---|---|---|
| | | | Normal | Horizontal | Inverted | |
| Example 1 | 0.1 | 0.01 | Not applicable | Not applicable | Not applicable | ○ |
| Example 2 | 0.4 | 0.05 | Not applicable | Not applicable | Not applicable | ○ |
| Comparative example 1 | 1.0 | 1.32 | Not applicable | Not applicable | Not applicable | ○ |
| Comparative example 2 | 150.0 | 19.74 | Not applicable | Applicable 100,000 cycles | Applicable 100,000 cycles | × |
| Comparative example 3 | 300.0 | 39.47 | Not applicable | Applicable 200,000 cycles | Applicable 150,000 cycles | × |

FIG. 18

|  | Example 3 | Example 4 | Example 5 | Comparative example 4 |
|---|---|---|---|---|
| Axial gap X1 (mm) | 0.1 | 0.3 | 0.5 | — |
| Lubricating oil leakage | None | None | None | Shaft dislodgement |

FIG. 19

|  | Example 3 | Example 4 | Example 5 | Comparative example 4 |
|---|---|---|---|---|
| Axial gap X1 (mm) | 0.1 | 0.3 | 0.5 | — |
| Lubricating oil leakage | None | None | None | Found |

|  | Kxx | Kxy | Kyx | Kyy |
|---|---|---|---|---|
| Two-arc segmented bearing | 39.40 | 21.70 | -28.00 | 1.43 |
| Three-arc segmented bearing | 13.90 | 15.80 | -17.50 | 10.10 |
| Four-arc segmented bearing | 10.50 | 17.50 | -17.00 | 10.60 |

FLUID LUBRICATED BEARING DEVICE

CROSS-REFERENCE TO RELATED APPLICATION

This application claims the priority benefit of Japan applications serial no. 2001-347725, filed Nov. 13, 2001, 2002-29520, filed Feb. 6, 2002, 2002-35790, filed Feb. 13, 2002 and 2002-281599, filed Sep. 26, 2002.

BACKGROUND OF THE INVENTION

1. Field of the Invention

The present invention relates to a fluid lubricated bearing device for allowing a lubricating oil film to be produced in a radial bearing gap to provide non-contact support of a rotating member. For example, this bearing device is suitable for use with: spindle motors incorporated into information apparatus, for example, a magnetic disk device such as an HDD or FDD, an optical disk device such as a CD-ROM, CD-R/RW, or DVD-ROM, a magneto-optical disk device such as an MD or MO; scanner motors incorporated into a copier, laser beam printer (LBP), or barcode reader; and small motors incorporated into electric appliances such as an axial fan.

2. Description of the Related Art

Each of the motors of the aforementioned types is required to satisfy higher speed, lower cost, and lower acoustic noise requirements in addition to higher rotational accuracy. One of the components that are decisively responsible for these requirements is a bearing for supporting the spindle of these motors. In recent years, use of those fluid lubricated bearings have been attempted or actually made which have sufficiently good properties to satisfy the aforementioned requirements. The fluid lubricated bearings of these types are largely divided into two categories: one with means for generating dynamic pressure to provide dynamic pressure to the lubricating oil in bearing gaps or the so-called hydrodynamic bearing, and the other without means for generating dynamic pressure or the so-called fluid cylindrical bearing (with its bearing surface shaped in a perfect circle).

FIG. 7 is an example configuration of a spindle motor of an information apparatus incorporating a hydrodynamic bearing device 31. This spindle motor, used for a disk drive device of a DVD-ROM or the like, is provided with a fluid lubricated bearing device 31 for rotatably supporting an axial member 32, a support member 34 attached to the axial member 32 to support an object to be driven such as an optical disk 33 (a turntable in this illustrated example), and a motor stator 35 and motor rotor 36 which are opposed to each other via a radial gap present therebetween.

The fluid lubricated bearing device 31 mainly consists of a housing 21 having an opening portion at one end and a bottom portion at the other end, a cylindrical bearing member 22 secured to the inner peripheral surface of the bearing member 22, the axial member 32 inserted into the inner peripheral surface of the bearing member 22, a thrust plate 23 providing on the bottom portion of the housing 21, and a seal member 24 attached to the opening portion of the housing 21. On the inner peripheral surface of the bearing member 22 or the outer peripheral surface of the axial member 32, there are provided grooves for generating dynamic pressure (dynamic pressure generating grooves). On the other hand, a lubricating oil is loaded into the space inside the housing 21.

The stator 35 is attached to the outer periphery of the housing 21 of the fluid lubricated bearing device 31, while the rotor 36 is attached to the support member 34. Flowing an electric current through the stator 35 causes the rotor 36 to rotate due to exciting force established between the stator 35 and the rotor 36, thereby allowing the support member 34 and the axial member 32 to rotate integrally.

The rotation of the axial member 32 causes the dynamic pressure generating grooves to produce a dynamic pressure action of the lubricating oil in the radial bearing gap between the inner peripheral surface of the bearing member 22 and the outer peripheral surface of the axial member 32, thereby providing radial non-contact support to the outer peripheral surface of the axial member 32. In addition, the end surface of the other end of the axial member 32 (the lower side in FIG. 7) is supported in the direction of thrust by means of the thrust plate 23.

In addition to the one mentioned above, such an bearing device is also available for providing non-contact support to the axial member in the radial and thrust direction by means of the dynamic pressure action produced in both the radial and thrust bearing gaps. In general, in the bearing of this type, a space defined by a thrust carrying face formed on the bottom portion of the housing and an end face of the axial member opposed thereto is formed in a sealed arrangement. Accordingly, on the outer periphery of the axial member, there are formed axial grooves (circulation grooves) provided with openings at both the end faces thereof to expose this seal space to ambient air.

The lubricating oil is loaded into the space inside of the housing 21 generally at the time of assembly of a spindle motor before the axial member 32 is installed, and the axial member 32 is built therein after the lubricating oil has been loaded. For this reason, it cannot be avoided to ingest ambient air into the inner space of the housing 21. Additionally, the air inside the inner space of the housing may be thermally expanded or contracted due to variations in ambient temperature, heat generated by the motor, or variations in atmospheric pressure during operations at high altitudes or transportation by airfreight. This may cause the lubricating oil to be pushed out of the seal space defined by the inner peripheral surface of the seal member 24 and the outer peripheral surface of the axial member 32 to migrate outside thereof. In particular, when the motor is operated in its inverted position (i.e., the opening portion of the housing 21 is oriented downwardly) or in its horizontal position (i.e., the opening portion of the housing 21 is oriented horizontally), the lubricating oil may readily flow toward the opening portion and stay there, thereby increasing the likelihood of leakage of the lubricating oil.

For the reasons mentioned above, motors incorporating the conventional fluid lubricated bearing device 31 were unreliable during operations in their inverted and horizontally oriented positions, and thus limitation was imposed on their operable positions.

Furthermore, in the fluid lubricated bearing device 31 configured as described above, the thrust bearing portion employs the end face at the other end of the axial member 32 by means of the thrust plate 23, and the axial member 32 is pushed against the thrust plate 23 by means of the magnetic force established between the stator 35 and the rotor 36, thereby restricting the axial movement of the axial member 32 towards the one end (the upper side in FIG. 7).

However, when a shock load exceeding the aforementioned magnetic force is imposed on the motor or the motor is operated in an inverted or horizontally oriented position, the axial member 32 may move axially towards the one end relative to the housing 21 to dislodge from the housing 21.

In the manufacturing process of the bearing member, a sleeve-shaped sintered metal is sized in a die to form the bearing member in a predetermined size. After the sizing followed by the removal from the die, the outer periphery of the bearing member expands radially outwardly due to spring-back. However, the circulation groove portion is not in contact with the die during the sizing and therefore has not been pressurized radially inwardly, thereby being provided with a less amount of spring-back when compared with other portions after the bearing member has been removed from the die. Accordingly, as shown in FIG. 8, after the sizing, the outer and inner periphery of the bearing member 22 is not of a complete round but of an uneven cross section with the vicinity of the circulation grooves 25 being reduced in diameter. Conventionally, the circulation grooves 25 are frequently formed at two positions on the outer periphery of the bearing member 22 (at opposite positions different by 180 degrees). In this case, the resulting cross section obtained after the sizing displays an ellipse with its minor axis being in the direction connecting between the circulation grooves 25.

However, such an elliptical shape, if remains unchanged, causes a narrow portion (in the direction of the minor axis) and a wide portion (in the direction of the major axis) to be formed in the radial bearing gap between the inner periphery of the bearing member 22 and the outer periphery of the axial member 32. In this case, the lifting effect provided by the hydrodynamic pressure on the shaft is reduced in the wide portion of the radial bearing gap, thereby causing axial runout due to a degradation in bearing rigidity in the direction of the elliptical major axis and thus probably having an adverse effect on NRRO or the like.

An object of the present invention is to provide a fluid lubricated bearing device and a motor that incorporates the same, which can be operated or transported with stability at any attitude without lubricating oil leakage out of the housing due to expansion and contraction of air remaining in the inner space thereof, under high and low temperature environments, or reduced pressure environments during operations at high altitudes or transportation by airfreight.

Another object of the present invention is to restrict the axial movement of the axial member relative to the housing towards one end thereof, thereby preventing the axial member from dislodging from the housing.

Another object of the present invention is to eliminate differences in bearing rigidity in all directions that is caused by deformations of the bearing member after having undergone spring-back, thereby ensuring high rotational accuracy.

SUMMARY OF THE INVENTION

To achieve the aforementioned objects, the present invention provides a fluid lubricated bearing device including: a housing with an opening portion provided on one end and a bottom portion provided on the other end; an axial member and a bearing member accommodated in the housing; a radial bearing portion, provided between an inner peripheral surface of the bearing member and an outer peripheral surface of the axial member, for allowing an oil film of a lubricating oil produced in a radial bearing gap to provide radial non-contact support to the axial member; and a seal member arranged in the opening portion of the housing. The fluid lubricated bearing device is configured such that the inner space of the housing is filled with the lubricating oil to such a level as not to cause leakage of the lubricating oil outside thereof even in the present of expansion or contraction of air remaining in the inner space of the housing under an environment of a reduced pressure. In the foregoing, barometric pressures under the environment of the reduced pressure are, for example, the atmospheric pressure to a pressure of 100 Torr.

For example, the fluid lubricated bearing device configured as described above can be obtained by vacuuming the inner space of the housing and then exposing the inner space of the housing to the atmospheric pressure to thereby replacing it with the lubricating oil (by vacuum pressure impregnation). More specifically, the fluid lubricated bearing device is first assembled without a lubricating oil having been loaded therein (e.g., in the manners shown in FIGS. 1 to 4). Then, the entire or part of the fluid lubricated bearing device (at least the opening portion that communicates with outside of the fluid lubricated bearing device) is soaked in the lubricating oil within a vacuum chamber, under which the air in the inner space of the housing is exhausted to create a vacuum therein. Thereafter, the fluid lubricated bearing device is exposed to the atmospheric pressure to allow the lubricating oil to fill in the inner space of the housing. It is thus possible to provide the fluid lubricated bearing device according to the present invention.

However, depending on the degree of vacuum in the vacuum chamber, there remains a small amount of air inside the housing after having been exposed to the atmospheric pressure. With a large amount of air remaining in the housing, expansion or contraction of the remaining air due to variations in ambient temperature would cause the lubricating oil to be pushed out of the housing, possibly resulting in leakage of the lubricating oil. In particular, the motor operating at an inverted or horizontal attitude would cause the lubricating oil to flow in the inner space of the housing to stay on the side of the opening portion, thereby resulting in the aforementioned lubricating oil leakage. Even with a small amount of air remaining in the housing, the remaining air may be expanded under environments of reduced pressures, such as operations at high altitudes or transportation by airfreight, to push the lubricating oil out of the housing, thereby possibly resulting in leakage of the lubricating oil.

The factors causing air to thermally expand include temperature and barometric pressure. However, a calculation of the amount of air expanded or contracted within the range of the temperature and barometric pressure conceivable for operational environments tells that the pressure has greater effects on the expansion of air.

In general, the following environments under which a small spindle motor incorporating the fluid lubricated bearing device according to the present invention is operated and stored are often employed.

Temperature: Operating temperature 0 to 60° C., Storage temperature −40 to 90° C.

Barometric pressure: Atmospheric pressure to 0.3 atm during transportation (at an altitude of about 10,000 m)

The rate of expansion is calculated in accordance with the equation of state of gas as follows:

$$PV=nRT$$

where P is the pressure, V is the volume, n is the number of moles, R is the gas constant, and T is the absolute temperature.

(1) For changes in temperature from −40 to 90° C. at a constant pressure:

$V_{90}/V_{-40}=363/233=1.56$ times (2) For changes in pressure from the atmospheric pressure to 0.3 atm at a constant temperature:

$V_{90}/V_{-40}=1/0.3=3.33$ times

As can be seen from the foregoing, to suppress lubricating oil leakage due to expansion of air, it is desirable to design the fluid lubricated bearing device in consideration of changes in barometric pressure, having a greater effect than temperature, under the environments specified within the range mentioned above in order to configure the device so as to be free from lubricating oil leakage.

For example, assume that the device is transported by airfreight at an altitude of 10,000 m. Since the barometric pressure is about 230 Torr (0.3 atm) in this case, it is necessary to load the lubricating oil so as not to cause lubricating oil leakage under an environment of a reduced pressure of 230 Torr. It is desirable to check for lubricating oil leakage at a pressure of 100 Torr with a certain allowance at the time of inspection during fabrication of the bearing device.

As described above, the fluid lubricated bearing device according to the present invention and a motor incorporating the fluid lubricated bearing device can be operated or transported with stability irrespective of the attitude of the motor without lubricating oil leakage out of the housing due to expansion and contraction of air remaining in the inner space thereof, under high and low temperature environments, or reduced pressure environments during operations at high altitudes or transportation by airfreight.

The fluid lubricated bearing device in which the inner space of the housing is filled with the lubricating oil as described above is just like an injector configured to be plugged at its top. This prevents the axial member from being axially displaced due to vibrations during transportation or from being dislodged from the housing, to some extent.

Furthermore, to implement the aforementioned objects, the present invention provides a fluid lubricated bearing device including: a housing with an opening portion provided on one end and a bottom portion provided on the other end; an axial member and a bearing member accommodated in the housing; a radial bearing portion, provided between an inner peripheral surface of the bearing member and an outer peripheral surface of the axial member, for allowing an oil film of the lubricating oil produced in a radial bearing gap to provide radial non-contact support to the axial member; a thrust bearing portion, provided on the bottom portion of the housing, for supporting an end face of the axial member on the same side as the other end of the housing in a direction of thrust; and a seal member arranged in the opening portion of the housing. The fluid lubricated bearing device is configured such that a projected portion is provided on the axial member, in contact with the seal member, to prevent an axial movement of the axial member relative to the housing towards the one end thereof.

In this configuration, the "projected portion" can be formed by being integrated with the axial member or by securing a member separate from the axial member to the axial member. On the other hand, the "projected portion" is not limited in shape to a particular one, and may be formed in any shape such as annular, partially annular, point-like, or pin-like shape. When the axial member is subjected to an external force or the gravitational force and thereby moved axially relative to the housing towards one end thereof, the projected portion contacts the seal member to thereby restrict further axial movement of the axial member relative to the housing. This allows the axial member to be retained within the housing and prevents it from dislodging therefrom.

In addition to the aforementioned configuration, it is also possible to provide a configuration which allows the inner space of the housing to be filled with the lubricating oil and which causes no lubricating oil leakage out of the housing even in the presence of expansion or contraction of air remaining in the inner space of the housing under environments of reduced pressures from the atmospheric pressure to 100 Torr.

In the aforementioned configuration, it is possible to provide an axial gap of 0.05 mm to 0.5 mm between the projected portion and the seal member. The values of the axial gap are those for the end face of the other end of the axial member in contact with the thrust bearing portion.

In steady operation (or rotation with the end face of the other end of the axial member being supported in contact with the thrust bearing portion), it is necessary to provide a certain axial gap therebetween in order to prevent the projected portion from contacting the seal member. In consideration of dimensional tolerances and assembly errors in each component, this axial gap needs to be 0.05 mm or more.

On the other hand, when the bearing device is subjected to repetitive vibrations or impact loads during operation or transportation, the axial member can move axially relative to the housing within the range of the aforementioned axial gap due to the presence of the aforementioned axial gap. For this reason, when the aforementioned axial gap is excessively large, the axial movement of the axial member relative to the housing can cause outside air to be ingested into the housing through a seal space (defined between the inner peripheral surface of the seal member and the outer peripheral surface of the axial member) or the lubricating oil inside the housing to be pushed out of the aforementioned seal space. Furthermore, as the aforementioned axial gap becomes greater, a larger amount of the lubricating oil is filled in the inner space of the housing, thereby providing larger variations in volume of the lubricating oil due to thermal expansion or contraction thereof. It is therefore necessary to provide a larger volume to the aforementioned seal space so as to accommodate the variations in volume to thereby prevent lubricating oil leakage out of the housing. However, it is often difficult to increase the axial size of the seal member due to a space-wise restriction. Additionally, it is not preferable to increase the inner diameter of the seal member since this can lead to a reduction in sealing function (degradation in capillary force).

According to the results of tests described later, it has been observed that the aforementioned axial gap less than or equal to 0.5 mm can prevent lubricating oil leakage from inside to outside of the housing. An appropriate range of the aforementioned axial gap is from 0.05 mm to 0.5 mm, preferably from 0.05 mm to 0.3 mm.

In the aforementioned configuration, it is possible to provide a seal space, tapered so as to gradually expand towards the one end, between the inner peripheral surface of the seal member and the outer peripheral surface of the axial member opposite thereto. The seal space, tapered as described above, causes the lubricating oil in the seal space to be drawn towards the narrower side of the seal space (into the housing) by capillary force. This prevents the lubricating oil leakage from inside to outside of the housing.

The tapered seal space described above can be formed by providing a tapered face on at least one of the inner peripheral surface of the seal member and the outer peripheral surface of the axial member. In the configuration with the tapered face provided on the outer peripheral surface of the axial member, the lubricating oil in the seal space is subjected to centrifugal force during rotation of the axial member, thereby causing the lubricating oil to be drawn towards the narrower side of the seal space along the tapered face of the axial member (towards inside of the housing). Thus, since the lubricating oil is retained in place by the centrifugal force in addition to the aforementioned capillary force, it is further ensured to prevent leakage of the lubricating oil.

Now, consider the fluid lubricated bearing device configured so as to support the axial end portion of the axial member in the direction of thrust in contact with the thrust bearing portion provided on the bottom portion of the housing. This configuration may allow the lubricating oil to increase in pressure in the space around the thrust bearing portion, thereby causing a difference in pressure to occur between it and the lubricating oil in the seal space between the inner peripheral surface of the seal member and the outer peripheral surface of the axial member. This difference in pressure can also likely occur when the dynamic pressure generating grooves are axially asymmetrically formed in width on the radial bearing portion as well as when the dynamic pressure generating grooves are designed symmetrically but with a large machining tolerance (in the taper shape on the axial member or the inner peripheral surface of the bearing member and dimensional accuracy of the width of the dynamic pressure generating grooves).

Such a difference in pressure would cause a local negative pressure to be produced in the lubricating oil in the inner space of the housing to thereby generate air bubbles in the lubricating oil, resulting in lubricating oil leakage or vibrations. Additionally, an increase in pressure of the lubricating oil around the thrust bearing portion would cause the axial member to be lifted or a decrease in pressure on the thrust bearing portion side would cause the axial member to be pushed against the carrying member such as the thrust plate, thereby causing the carrying member to be abnormally worn.

These problems can be eliminated by providing circulation grooves that communicate the thrust bearing portion with the seal space. That is, even with the difference in pressure of the lubricating oil between the space around the thrust bearing portion and the seal space, the lubricating oil can flow between both the spaces through the circulation grooves, thereby equalizing the pressure of the lubricating oil between both the spaces.

The aforementioned circulation grooves can be configured of a first radial groove formed on the side of the bottom portion of the housing between one end face of the bearing member and a surface of the housing opposite thereto, a second radial groove formed on the side of the opening portion of the housing between the other end face of the bearing member and a surface of the seal member opposite thereto, and an axial groove formed between the outer peripheral surface of the bearing member and the inner peripheral surface of the housing.

The "fluid lubricated bearing device" according to the present invention includes a so-called hydrodynamic bearing device with dynamic pressure generating means for generating a dynamic pressure in the lubricating oil in the bearing gap, and a so-called fluid cylindrical bearing device (a bearing device having a bearing surface of a complete round in cross section) without the dynamic pressure generating means. However, the hydrodynamic bearing device is preferable which has an advantage in shaft supporting function. For the hydrodynamic bearing device, as the aforementioned "dynamic pressure generating means", it is possible to provide a hydrodynamic bearing device configured to have dynamic pressure generating grooves on one of the inner peripheral surface of the bearing member and the outer peripheral surface of the axial member, which face to each other via the radial bearing gap. It is also possible to provide a hydrodynamic bearing device configured to have one of the aforementioned circumferential surfaces formed in a non-circular shape or a plurality of circular segments such as two-arc segments, three-arc segments, or four-arc segments (a bearing with its radial bearing surface formed of a plurality of circular segments is also called an "arc bearing"). In the former bearing device, as the shape of the dynamic pressure generating grooves, it is possible to employ a variety of well known dynamic pressure generating groove shapes such as herringbone patterns, spiral patterns, or patterns of a plurality of axial grooves (a bearing with a plurality of axial grooves provided on its radial bearing surface is also called a "stepped bearing"). Furthermore, a thrust dynamic pressure bearing portion may be configured by forming dynamic pressure generating grooves in herringbone patterns or in a spiral fashion on one of the surfaces facing to each other via the thrust bearing gap.

On the other hand, as the material of the bearing member, it is possible to employ copper alloys, stainless steel, brass, aluminum alloys or the like in addition to porous sintered metal.

Furthermore, to achieve the aforementioned objects, the present invention provides a fluid lubricated bearing device including an axial member, a bearing member formed of a sintered metal containing oil and opposed to an outer periphery of the axial member via a radial bearing gap, and a housing with the bearing member secured to an inner periphery thereof. The fluid lubricated bearing device is configured such that the axial member is rotated relative to the bearing member to generate a hydrodynamic pressure in the radial bearing gap to provide non-contact support to the axial member, and grooves are provided with openings at their both end faces, through which a lubricating fluid flows, on the outer periphery of the bearing member. The fluid lubricated bearing device is provided with three or more, or preferably three, of the aforementioned grooves.

Three or more of the grooves provided as described above can increase the bearing rigidity in each direction, thereby providing improved rotational accuracy to the bearing.

The axial member is provided with a flange portion facing to one end face of the bearing member to generate a hydrodynamic pressure in the thrust bearing gap formed between the end face of the bearing member and the end face of the flange portion, thereby making it also possible to provide non-contact support to the axial member in the direction of thrust. In this case, a larger amount of the lubricating fluid in the thrust bearing gap flows into the grooves due to the effects of centrifugal force. However, the three or more circulation grooves can positively accommodate such a lubricating fluid.

When the dynamic pressure generating grooves on the bearing surface are formed asymmetrically to push the lubricating fluid into the aforementioned thrust bearing gap, a much larger amount of the lubricating fluid flows into the grooves. However, even in this case, the lubricating fluid can be accommodated with an allowance.

BRIEF DESCRIPTION OF THE DRAWINGS

FIG. 16 is a view showing the results of tests conducted under reduced pressures;

FIG. 17 is a view showing the results of tests conducted using an actual fluid lubricated bearing device;

FIG. 18 is a view showing the results of tests conducted on the leakage of the lubricating oil;

FIG. 19 is a view showing the results of tests conducted on the leakage of the lubricating oil;

DETAILED DESCRIPTION OF THE PREFERRED EMBODIMENTS

Now, the present invention will be explained below in accordance with the embodiments.

Figure 1:
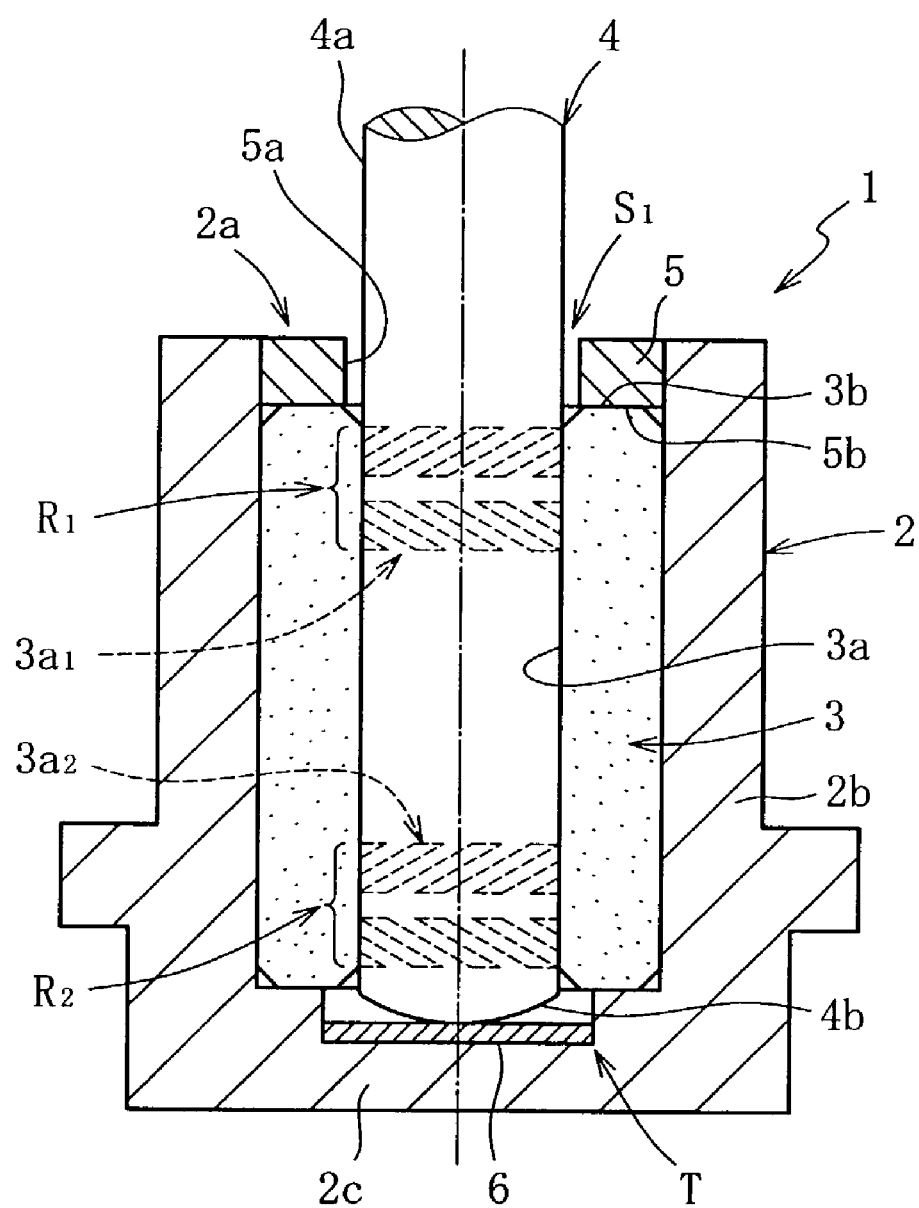
FIG. 1 is a cross-sectional view illustrating a hydrodynamic bearing device according to a first embodiment of the present invention.
Figure 7:
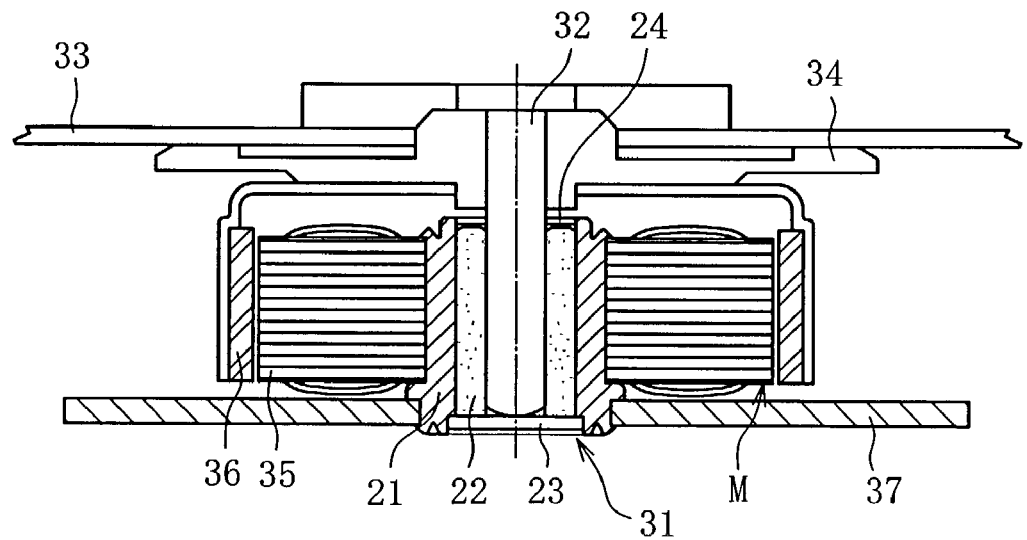
FIG. 7 is a cross-sectional view illustrating a spindle motor that incorporates a conventional hydrodynamic bearing device.

FIG. 1 is a cross-sectional view illustrating a hydrodynamic bearing device 1 as an example of a fluid lubricated bearing device according to a first embodiment of the present invention. The fluid lubricated bearing device 1, incorporated into a spindle motor used, for example, in an information apparatus as shown in FIG. 7, consists mainly of a cylindrical bottomed housing 2 with an opening portion 2a provided on one end (at the upper side in FIG. 1) and a bottom portion 2c provided on the other end (at the lower side in FIG. 1), a cylindrical bearing member 3 secured to the inner peripheral surface of the housing 2, an axial member 4, and a seal member 5 secured to the opening portion 2a of the housing 2. As described later, a first radial bearing portion R1 and a second dynamic pressure bearing portion R2 are provided in an axially spaced-apart relation between the inner peripheral surface 3a of the bearing member 3 and the outer peripheral surface 4a of the axial member 4. On the other hand, there is also provided a thrust bearing portion T between the bottom portion 2c of the housing 2 and the lower end face 4b of the axial member 4.

The housing 2 is formed, for example, of a soft metal such as brass, and is provided with a cylindrical side portion 2b and the bottom portion 2c. For example, there is provided a plastic thrust plate 6 on a region serving as a thrust bearing surface at the inner bottom surface of the bottom portion 2c. In this embodiment, the housing 2 is configured such that the side portion 2b is integrated with the bottom portion 2c. Alternatively, the side portion 2b and the bottom portion 2c may be configured separately from each other such that a metallic lid-shaped member serving as the bottom portion 2c is press-fit into the opening portion on the other end of the side portion 2b and then tightly secured thereto with an adhesive or the like. In this case, the thrust plate 6 is disposed upon the aforementioned lid-shaped member.

The axial member 4 is formed, for example, of a stainless steel (SUS420J2) or the like, with the lower end face 4b being formed in a spherically convex shape.

For example, the bearing member 3 is formed of a porous sintered metal, especially of a porous sintered metal mainly composed of copper. On the other hand, on the inner peripheral surface 3a of the bearing member 3, there are provided two regions or upper and lower regions, which serve as radial bearing surfaces (the radial bearing surfaces of the first radial bearing portion R1 and the second radial bearing portion R2) in an axially spaced-apart relation. For example, in these regions, there are provided dynamic pressure generating grooves 3a1 and 3a2 having herringbone patterns, respectively.

The axial member 4 is inserted into the inside of the bearing member 3 along the inner peripheral surface 3a thereof. As a result, the outer peripheral surface 4a of the axial member 4 faces to the respective regions (two or the upper and lower regions) serving as the radial bearing surfaces on the inner peripheral surface 3a of the bearing member 3 via the radial bearing gaps. On the other hand, the lower end face 4b of the axial member 4 contacts the upper face of the thrust plate 6.

The seal member 5, annular in shape, is press-fit into the inner peripheral surface of the opening portion 2a of the housing 2, and then secured thereto with an adhesive or the like. In this embodiment, the inner peripheral surface 5a of the seal member 5 is formed cylindrically with the lower end face 5b of the seal member 5 being in contact with the upper end face 3b of the bearing member 3.

The inner peripheral surface 5a of the seal member 5 faces to the outer peripheral surface 4a of the axial member 4 via a predetermined gap, thereby forming a cylindrical seal space S1 therebetween. The inner space of the housing 2 sealed with the seal member 5 as well as the internal pores of the bearing member 3 (pores in the porous structure) are filled with a lubricating oil without the presence of air, so that the oil surface of the lubricating oil is within the seal space S1. The seal space S1 is set so as to have a volume greater than the amount of variations in volume, caused by changes in temperature within its allowable operational range, of the lubricating oil filled in the inner space of the housing 2. This allows the oil surface of the lubricating oil to be always maintained within the seal space S1 even in the presence of a variation in volume of the lubricating oil caused by a change in temperature.

For example, the lubricating oil is loaded into the inner space of the housing 2 in the following manner. First, each of the parts (the housing 2, the bearing member 3, the axial member 4, the thrust plate 6, and the seal member 5) is assembled into the fluid lubricated bearing device 1 having no lubricating oil loaded therein, which is in turn soaked in a lubricating oil within a vacuum chamber. This allows the air in the inner space of the housing 2 to be drawn and evacuated due to the vacuum inside the vacuum chamber, thereby leaving no air in the inner space. Thereafter, when the vacuum chamber is exposed to the atmospheric pressure, the inner space of the housing 2 is filled with the lubricating oil. After the lubricating oil has been introduced therein, the fluid lubricated bearing device 1 is taken out of the vacuum chamber, and then heated to the operational upper-limit temperature of the fluid lubricated bearing device 1. As the fluid lubricated bearing device 1 is heated, the lubricating oil filled in the inner space of the housing 2 is thermally expanded to discharge excessive lubricating oil out of the seal space S1. This allows the oil surface of the lubricating oil to be maintained within the seal space S1 even when the fluid lubricated bearing device 1 operates at the operational upper-limit temperature. After the heating is stopped, the oil surface of the lubricating oil is lowered as the temperature decreases to settle to an appropriate level within the seal space S1.

In the aforementioned lubricating oil loading process, a slight amount of air may be left in the inner space of the housing 2 depending on the degree of vacuum in the vacuum chamber. However, such an amount of remaining air may be acceptable that is controlled to a predetermined level sufficiently enough not to allow the lubricating oil to be pushed out of the seal space S1 and thereby migrate outside of the housing 2 due to the expansion of the air remaining in the inner space of the housing 2 under the potential environments of operation and transportation of the fluid lubricated bearing device 1 and the motor incorporating the same. In this embodiment, under a reduced pressure of 100 Torr, lubricating oil leakage to outside of the housing 2 is eliminated when the fluid lubricated bearing device 1 is placed in a normal position (with the side of the opening portion 2a of the housing 2 being oriented upwardly), in an inverted position (with the side of the opening portion 2a of the housing 2 being oriented downwardly), in a horizontal position (with the side of the opening portion 2a of the housing 2 being oriented horizontally), and in a tilted position (with the side of the opening portion 2a of the housing 2 being oriented in a tilted direction).

In the fluid lubricated bearing device 1 configured as described above, rotation of the axial member 4 causes a dynamic pressure to be produced in the lubricating oil in the aforementioned radial bearing gap, thereby allowing the film of the lubricating oil formed in the aforementioned radial bearing gap to provide radially rotatable non-contact support to the outer peripheral surface 4a of the axial member 4. This allows the first radial bearing portion R1 and the second radial bearing portion R2 to be formed that provide radially rotatable non-contact support to the axial member 4. At the same time, the thrust plate 6 provides contact support to the lower end face 4b of the axial member 4, thereby forming the thrust bearing portion T for rotatably supporting the axial member 4 in the direction of thrust.

The fluid lubricated bearing device 1 according to this embodiment eliminates lubricating oil leakage from inside of the housing 2 to outside thereof and enables stable operation and transportation irrespective of the position of the motor even in the presence of expansion or contraction of air remaining inside of the housing due to variations in ambient temperature, heat generated in the motor, or variations in atmospheric pressure during operations at high altitudes or transportation by airfreight.

Figure 2:
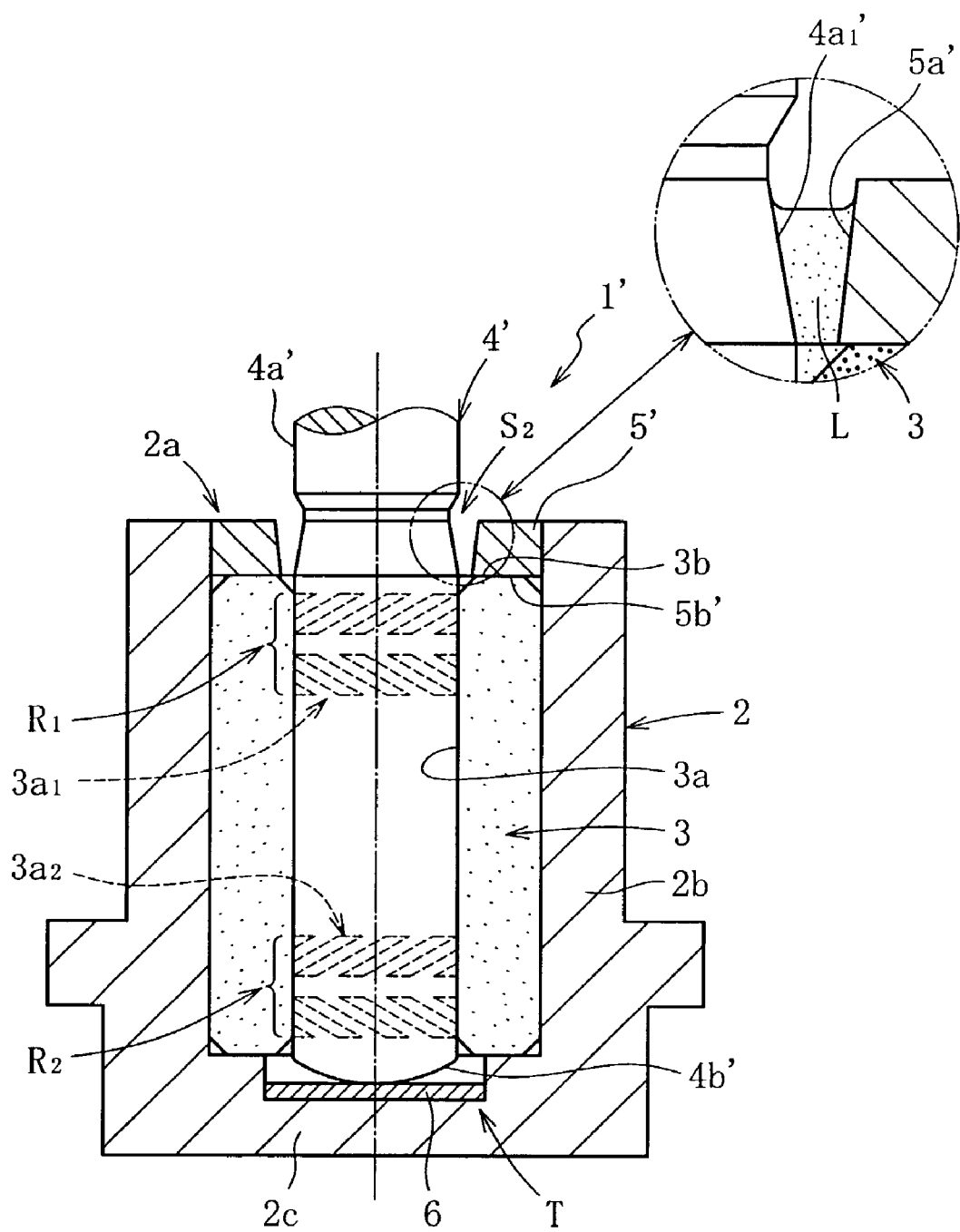
FIG. 2 is a cross-sectional view illustrating a hydrodynamic bearing device according to a second embodiment of the present invention.

FIG. 2 illustrates a hydrodynamic bearing device 1' according to a second embodiment. The fluid lubricated bearing device 1' according to this embodiment is different from the aforementioned first embodiment in that a seal space S2 defined between the inner peripheral surface of a seal member 5' and the outer peripheral surface of an axial member 4' facing to the seal member 5' is tapered so as to gradually expand (outwardly) towards one end of the housing 2. In this embodiment, to form the tapered seal space S2, the inner peripheral surface of the seal member 5' is provided with a tapered face 5a' that is increased gradually in diameter towards one end, while the outer peripheral surface of the axial member 4' facing to the tapered face 5a' is provided with a tapered face 4a1' that is reduced gradually in diameter towards the one end. One of the tapered face 5a' and the tapered face 4a1' can be provided with a cylindrical surface.

As shown in the enlarged view circled with alternate long and short dashed lines in FIG. 2, the oil surface of the lubricating oil L present within the seal space S2 causes the lubricating oil L within the seal space S2 to be drawn due to capillary force towards the narrower side of the seal space S2 (towards the other end or inside of the housing 2). This effectively prevents leakage of the lubricating oil L from inside to outside of the housing 2. Additionally, the tapered face 4a1' provided on the outer peripheral surface of the axial member 4' causes the lubricating oil L in the seal space S2 to be subjected to centrifugal force during rotation of the axial member 4' and thereby drawn along the tapered face 4a1' towards the narrower side of the seal space S2 (towards inside of the housing 2). Thus, since the lubricating oil L is retained in place by the centrifugal force in addition to the aforementioned capillary force, it is further ensured to prevent leakage of the lubricating oil L when compared with the fluid lubricated bearing device 1 according to the aforementioned first embodiment.

Figure 3:
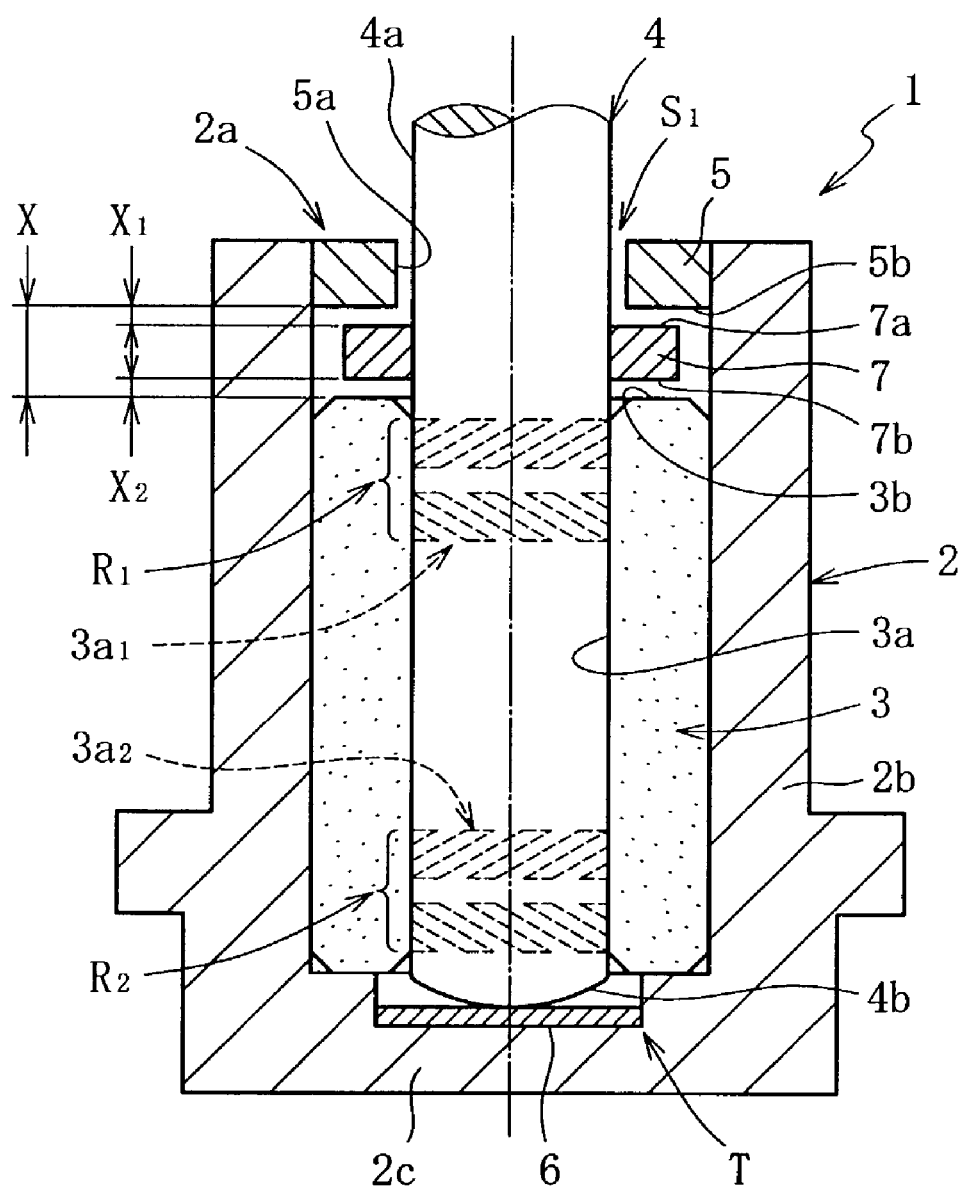
FIG. 3 is a cross-sectional view illustrating a hydrodynamic bearing device according to a third embodiment of the present invention.

FIG. 3 illustrates a hydrodynamic bearing device 1 according to a third embodiment. The fluid lubricated bearing device 1, incorporated into a spindle motor used, for example, in an information apparatus as shown in FIG. 7, consists mainly of a cylindrical bottomed housing 2 with an opening portion 2a provided on one end (at the upper side in FIG. 3) and a bottom portion 2c provided on the other end (at the lower side in FIG. 3), a cylindrical bearing member 3 secured to the inner peripheral surface of the housing 2, an axial member 4, and a seal member 5 secured to the opening portion 2a of the housing 2. As described later, a first radial bearing portion R1 and a second dynamic pressure bearing portion R2 are provided in an axially spaced-apart relation between the inner peripheral surface 3a of the bearing member 3 and the outer peripheral surface 4a of the axial member 4. On the other hand, there is also provided a thrust bearing portion T between the bottom portion 2c of the housing 2 and the lower end face 4b of the axial member 4.

The housing 2 is formed, for example, of a soft metal such as brass, and is provided with a cylindrical side portion 2b and the bottom portion 2c. For example, there is provided a plastic thrust plate 6 on a region serving as a thrust bearing surface at the inner bottom surface of the bottom portion 2c. In this embodiment, the housing 2 is configured such that the side portion 2b is integrated with the bottom portion 2c. Alternatively, the side portion 2b and the bottom portion 2c may be configured separately from each other such that a metallic lid-shaped member serving as the bottom portion 2c is press-fit into the opening portion on the other end of the side portion 2b and then tightly secured thereto with an adhesive or the like. In this case, the thrust plate 6 is disposed upon the aforementioned lid-shaped member.

The axial member 4 is formed, for example, of a stainless steel (SUS420J2) or the like, with the lower end face 4b being formed in a spherically convex shape. A disk-shaped washer 7 or a projected portion is press-fit over the outer peripheral surface 4a of the axial member 4 and secured thereto with appropriate means such as an adhesive.

For example, the bearing member 3 is formed of a porous sintered metal, especially of a porous sintered metal mainly composed of copper. On the other hand, on the inner peripheral surface 3a of the bearing member 3, there are provided two regions or upper and lower regions, which serve as radial bearing surfaces (the radial bearing surfaces of the first radial bearing portion R1 and the second radial bearing portion R2) in an axially spaced-apart relation. For example, in these regions, there are provided dynamic pressure generating grooves 3a1 and 3a2 having herringbone patterns, respectively.

The axial member 4 is inserted into the inside of the bearing member 3 along the inner peripheral surface 3a thereof. As a result, the outer peripheral surface 4a of the axial member 4 faces to the respective regions (two or the upper and lower regions) serving as the radial bearing surfaces on the inner peripheral surface 3a of the bearing member 3 via the radial bearing gaps. On the other hand, the lower end face 4b of the axial member 4 contacts the upper face of the thrust plate 6.

The seal member 5, annular in shape, is press-fit into the inner peripheral surface of the opening portion 2a of the housing 2, and then secured thereto with an adhesive or the like. In this embodiment, the inner peripheral surface 5a of the seal member 5 is formed cylindrically, and the lower end face 5b of the seal member 5 is axially spaced apart from the upper end face 3b of the bearing member 3 by a predetermined axial gap X to face thereto.

The washer 7 provided on the axial member 4 is disposed within the axial gap X. With the lower end face 4b of the axial member 4 being in contact with the upper face of the thrust plate 6, the upper end face 7a of the washer 7 is spaced apart from the lower end face 5b of the seal member 5 by an axial gap X1 while the lower end face 7b of the washer 7 is spaced apart from the upper end face 3b of the bearing member 3 by an axial gap X2. The axial gap X1 is 0.05 mm to 0.5 mm in length, preferably 0.05 mm to 0.3 mm. The axial gap X2 may be set at a length that is sufficiently enough not to allow the lower end face 7b of the washer 7 to contact the upper end face 3b of the bearing member 3 during rotation of the axial member 4, preferably at 0.05 mm or more in consideration of dimensional tolerances and assembly errors in each component. The axial gap X2 may be equal to the axial gap X1 in length, or greater or less than the axial gap X1.

The inner peripheral surface 5a of the seal member 5 faces to the outer peripheral surface 4a of the axial member 4 via a predetermined gap, thereby forming a cylindrical seal space S1 therebetween. The inner space of the housing 2 sealed with the seal member 5 as well as the internal pores of the bearing member 3 (pores in the porous structure) are filled with the lubricating oil without the presence of air, so that the oil surface of the lubricating oil is within the seal space S1. The seal space S1 is set so as to have a volume greater than the amount of variations in volume, caused by changes in temperature within its allowable operational range, of the lubricating oil filled in the inner space of the housing 2. This allows the oil surface of the lubricating oil to be always maintained within the seal space S1 even in the presence of a variation in volume of the lubricating oil caused by a change in temperature.

For example, as in the same manner as the first embodiment, the lubricating oil is loaded into the inner space of the housing 2. Thus, even when the air remaining in the inner space of the housing is expanded or contracted under the environments between the atmospheric pressure and a reduced pressure of 100 Torr, lubricating oil leakage from inside of the housing 2 is eliminated irrespective of the attitude of the motor.

In this embodiment, when the axial member 4 is subjected to an external force or gravitational force to move axially towards the one end relative to the housing 2, this causes the washer 7 provided on the axial member 4 to contact the seal member 5, thereby restricting further axial movement of the axial member 4. This allows the axial member 4 to be always retained within the housing 2 and thereby prevented from dislodging from the housing 2.

Furthermore, since the washer 7 is separated from the seal member 5 by an axial gap X1 of 0.05 mm to 0.5 mm, the washer 7 and the seal member 5 are not in contact with each other under normal operations (during rotation with the lower end face 4b of the axial member 4 being supported in contact with the thrust plate 6), thereby providing stable running conditions. Additionally, even when the axial member 4 moves axially within the range of the axial gap X1 relative to the housing 2, air will never be ingested into the housing 2 or the lubricating oil filled in the housing 2 will never be pushed out of the seal space S1 to leak therefrom.

The other discussions follow those of the first embodiment and will not be repeatedly presented here.

Figure 4:
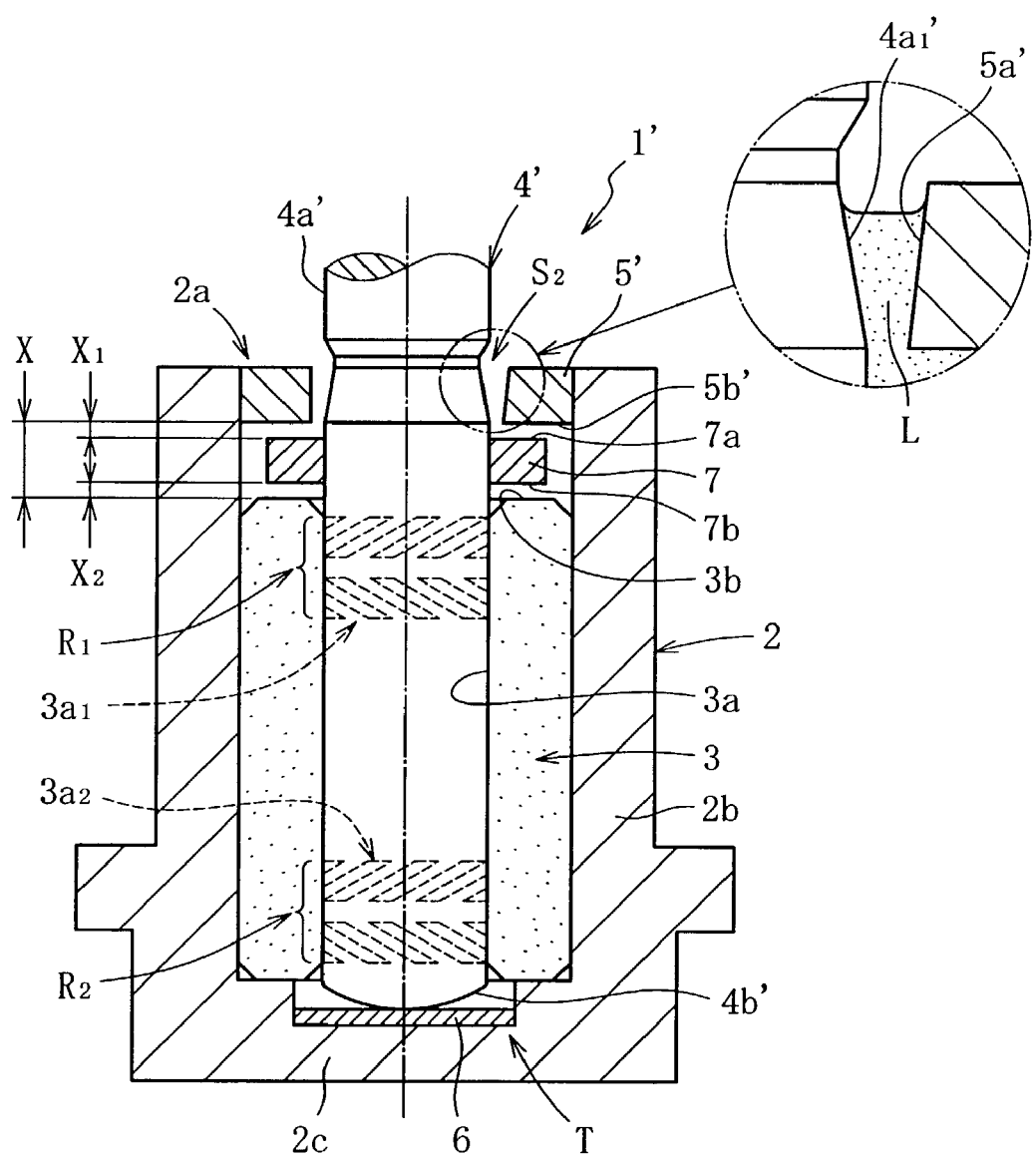
FIG. 4 is a cross-sectional view illustrating a hydrodynamic bearing device according to a fourth embodiment of the present invention.

FIG. 4 illustrates a fluid lubricated bearing device 1' according to a fourth embodiment. The fluid lubricated bearing device 1' according to this embodiment is different from the aforementioned third embodiment in that a seal space S2 defined between the inner peripheral surface of a seal member 5' and the outer peripheral surface of an axial member 4' facing to the seal member 5' is tapered so as to gradually expand (outwardly) towards one end of the housing 2. In this embodiment, to form the tapered seal space S2, the inner peripheral surface of the seal member 5' is provided with a tapered face 5a' that is increased gradually in diameter towards one end, while the outer peripheral surface of the axial member 4' facing to the tapered face 5a' is provided with a tapered face 4a1' that is reduced gradually in diameter towards the one end. One of the tapered face 5a' and the tapered face 4a1' can be provided with a cylindrical surface.

As shown in the enlarged view circled with alternate long and short dashed lines in FIG. 4, the oil surface of the lubricating oil L present within the seal space S2 causes the lubricating oil L within the seal space S2 to be drawn due to capillary force towards the narrower side of the seal space S2 (towards the other end or inside of the housing 2). This effectively prevents leakage of the lubricating oil L from inside to outside of the housing 2. Additionally, the tapered face 4a1' provided on the outer peripheral surface of the axial member 4' causes the lubricating oil L in the seal space S2 to be subjected to centrifugal force during rotation of the axial member 4' and thereby drawn along the tapered face 4a1' towards the narrower side of the seal space S2 (towards inside of the housing 2). Thus, since the lubricating oil L is retained in place by the centrifugal force in addition to the aforementioned capillary force, it is further ensured to prevent leakage of the lubricating oil L when compared with the fluid lubricated bearing device 1 according to the aforementioned third embodiment.

Figure 9:
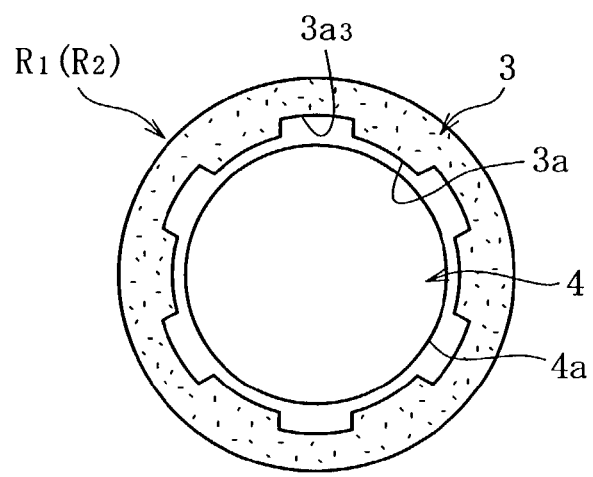
FIG. 9 is a cross-sectional view illustrating an example of dynamic pressure generating means in which a plurality of axial dynamic pressure generating grooves are formed on the inner peripheral surface of a bearing member.

In the embodiments described above, the dynamic pressure generating grooves 3a1 and 3a2 having herringbone patterns are formed as dynamic pressure generating means on the inner peripheral surface 3a of the bearing member 3 serving as the radial bearing surfaces (the radial bearing surfaces of the first radial bearing portion R1 and the second radial bearing portion R2). However, instead of the herringbone pattern, dynamic pressure generating grooves having spiral patterns may be formed. Alternatively, as shown in FIG. 9, a plurality of dynamic pressure generating grooves 3a3 formed axially may be provided as dynamic pressure generating means on the inner peripheral surface 3a of the bearing member 3 serving as the radial bearing surface (a so-called "stepped bearing").

Figure 10:
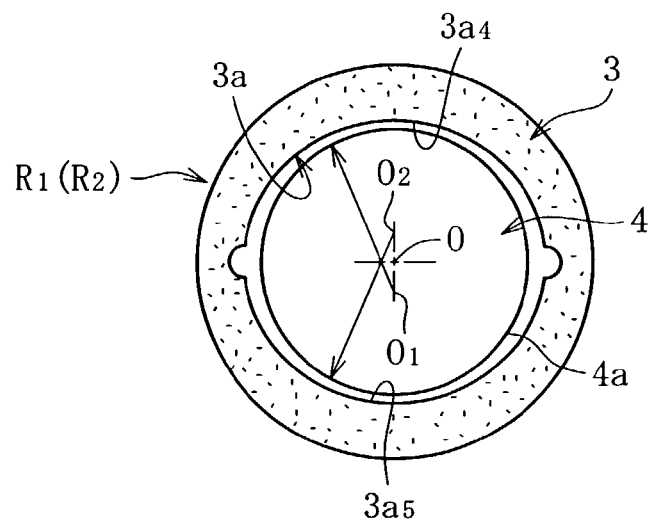
FIG. 10 is a cross-sectional view illustrating an example of dynamic pressure generating means in which the inner peripheral surface of a bearing member is formed of a plurality of arc segments.
Figure 11:
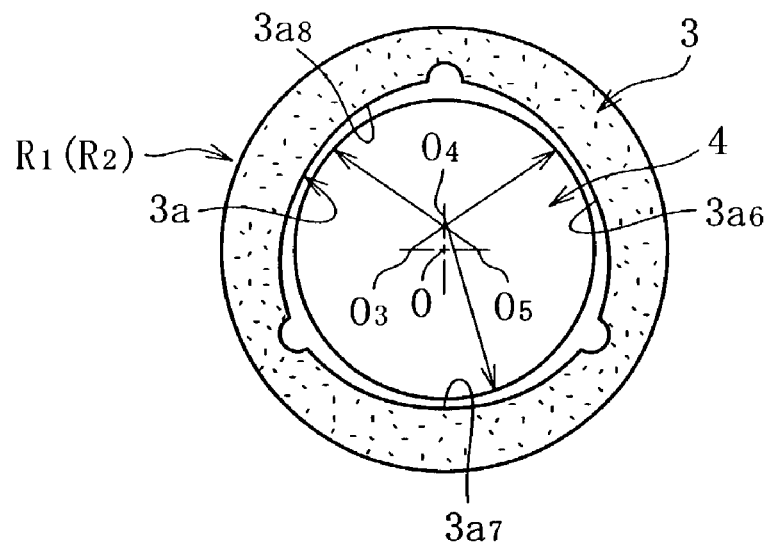
FIG. 11 is a cross-sectional view illustrating an example of dynamic pressure generating means in which the inner peripheral surface of a bearing member is formed of a plurality of arc segments.
Figure 12:
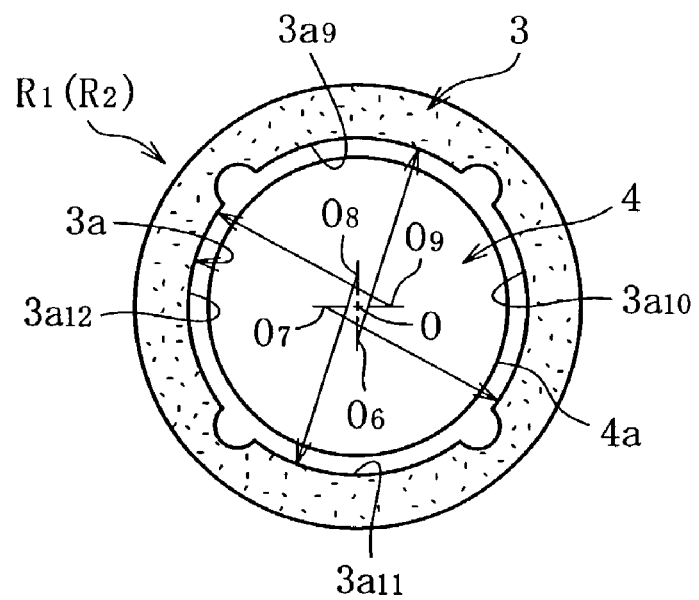
FIG. 12 is a cross-sectional view illustrating an example of dynamic pressure generating means in which the inner peripheral surface of a bearing member is formed of a plurality of arc segments.

Alternatively, as shown in FIGS. 10 to 12, as dynamic pressure generating means, the inner peripheral surface 3a of the bearing member 3 serving as the radial bearing surfaces (the radial bearing surfaces of the first radial bearing portion R1 and the second radial bearing portion R2) may be formed non-circularly, for example, of a plurality of arc-shaped segments (a so-called "arc-shaped bearing"). The example shown in FIG. 10 is configured such that the inner peripheral surface 3a of the bearing member 3 is formed of two arc segmented faces (3a4 and 3a5). The center of curvature O1 of the arc segmented face 3a4 and the center of curvature O2 of the arc segmented face 3a5 are offset at an equal distance from the outer peripheral surface 4a of the axial member 4 (having a complete round shape), respectively. The example shown in FIG. 11 is configured such that the inner peripheral surface 3a of the bearing member 3 is formed of three arc-shaped segments (3a6, 3a7, and 3a8). The center of curvature O3 of the arc segmented face 3a6, the center of curvature O4 of the arc segmented face 3a7, and the center of curvature O5 of the arc segmented face 3a8 are offset at an equal distance from the outer peripheral surface 4a of the axial member 4 (having a complete round shape), respectively. The example shown in FIG. 12 is configured such that the inner peripheral surface 3a of the bearing member 3 is formed of four arc-shaped segments (3a9, 3a10, 3a11, and 3a12). The center of curvature O6 of the arc segmented face 3a9, the center of curvature O7 of the arc segmented face 3a10, the center of curvature O8 of the arc segmented face 3a11, and the center of curvature O9 of the arc segmented face 3a12 are offset at an equal distance from the outer peripheral surface 4a of the axial member 4 (having a perfect circular shape), respectively.

The aforementioned dynamic pressure generating means may be provided on the outer peripheral surface 4a of the axial member 4.

Figure 13:
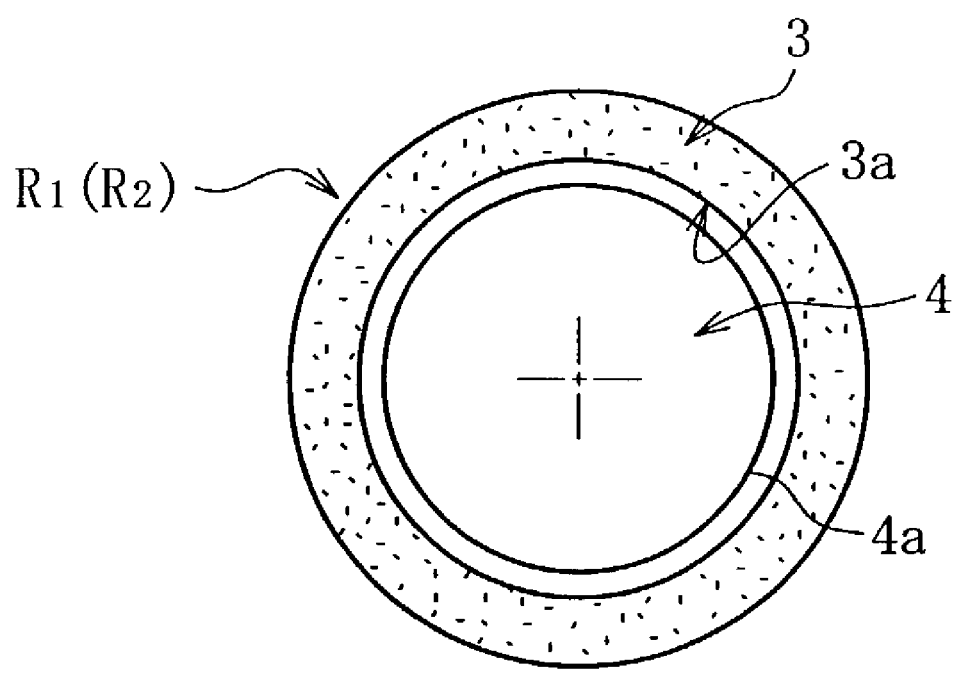
FIG. 13 is a cross-sectional view illustrating an example of a radial bearing portion formed in the shape of a complete round without dynamic pressure generating means.

Alternatively, as shown in FIG. 13, the first radial bearing portion R1 (the second radial bearing portion R2) may be a "cylindrical bearing" having no dynamic pressure generating means.

Figure 14:
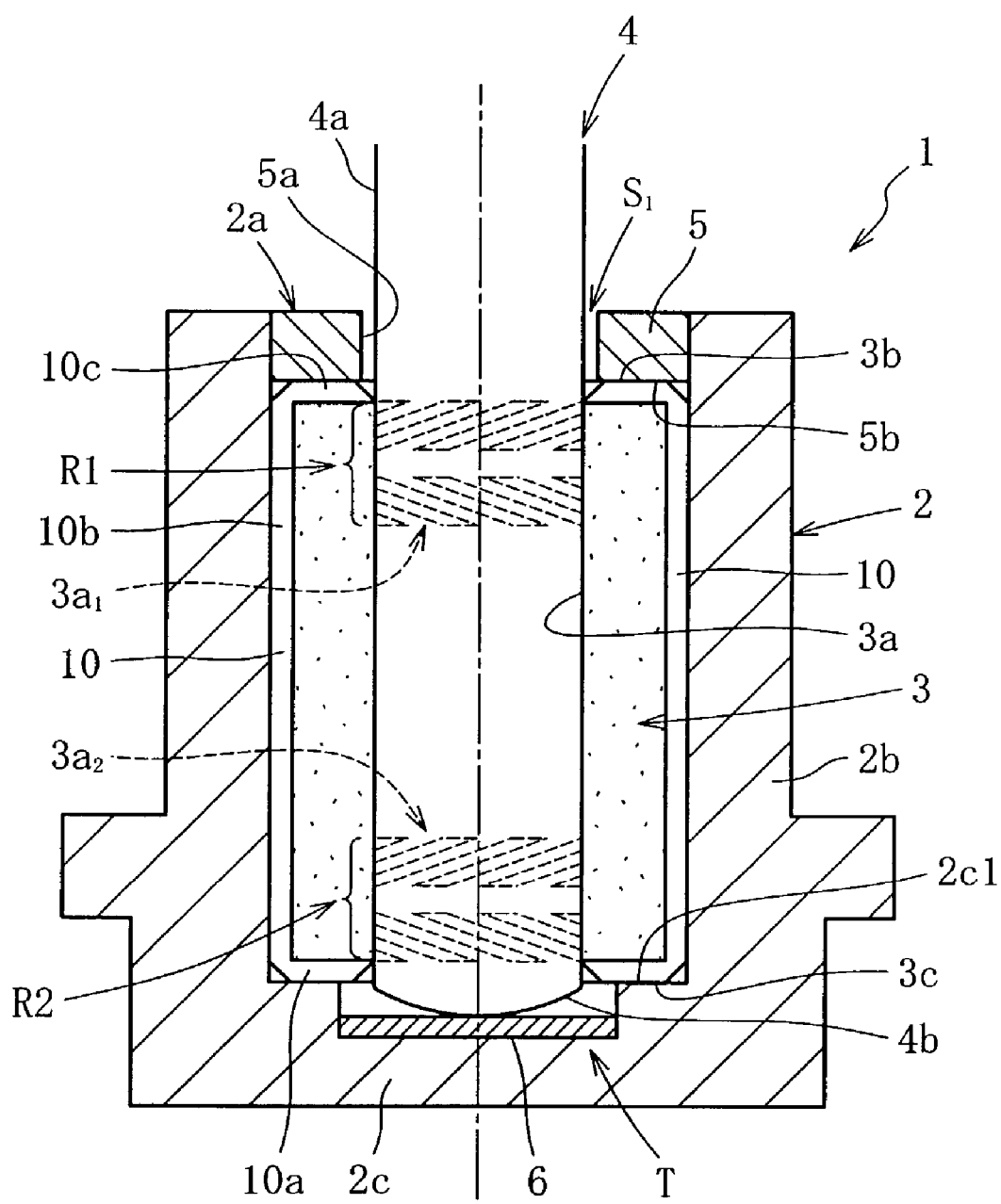
FIG. 14 is a cross-sectional view illustrating a fluid lubricated bearing device with circulation grooves according to an embodiment.

The embodiment shown in FIG. 14 is the hydrodynamic bearing device according to the embodiments, shown in FIGS. 1 and 2, in which the thrust bearing portion T is in communication with the seal space S1, defined between the inner peripheral surface 5a of the seal member 5 and the outer peripheral surface 4a of the axial member 4, through circulation grooves 10 that are provided at one or a plurality of positions (at two positions in the illustrated example) in the circumferential direction.

The inner peripheral surface 5a of the seal member 5 faces to the outer peripheral surface 4a of the axial member 4 via a predetermined gap, thereby forming a cylindrical seal space S1 therebetween. The inner space of the housing 2 sealed with the seal member 5 as well as the internal pores of the bearing member 3 (pores in the porous structure) are filled with the lubricating oil without the presence of air, so that the oil surface of the lubricating oil is within the seal space S1. The seal space S1 is set so as to have a volume greater than the amount of variations in volume, caused by changes in temperature within its allowable operational range, of the lubricating oil filled in the inner space of the housing 2. This allows the oil surface of the lubricating oil to be always maintained within the seal space S1 even in the presence of a variation in volume of the lubricating oil caused by a change in temperature.

The circulation grooves 10 has first and second radial grooves 10a and 10c and an axial groove 10b, with both the radial grooves 10a and 10c being coupled to both ends of the axial groove 10b. The first radial groove 10a is formed between one end of the bearing member 3 or an end face 3c (closer to the bottom portion 2c of the housing) and a face of the housing 2 opposite thereto, more specifically, an inner face 2c1 of the bottom portion 2c. On the other hand, the second radial groove 10c is formed between the other end of the bearing member 3 or the end face 3b (closer to the opening portion 2a of the housing) and a face of the seal member 5 opposite thereto, more specifically, the inner face 5b of the seal member 5. The axial groove 10b is formed between the outer peripheral surface of the bearing member 3 and the inner peripheral surface of the side portion 2b of the housing 2.

In the embodiment shown in FIG. 14, the first and second radial grooves 10a and 10c are formed on the end faces 3c and 3b of the bearing member 3, respectively, while the axial groove 10b is formed on the outer peripheral surface of the bearing member 3. When the axial member 4 is rotated to cause the lubricating oil to increase in pressure in the space of the thrust bearing portion T (in the space around the axial end portion of the axial member 4), this causes the lubricating oil to start flowing towards the seal space S1 from the vicinity of the thrust bearing portion T, thereby allowing the lubricating oil to be equalized in pressure in the vicinities of the thrust bearing portion T and the seal space S1. This prevents generation of air bubbles caused by a negative pressure locally produced in the lubricating oil as well as lubricating fluid leakage or vibrations resulting therefrom. Furthermore, the axial member 4 is also prevented from being lifted due to an increase in pressure of the lubricating oil in the vicinity of the thrust bearing portion T. When the pressure in the seal space S1 has increased on the contrary to the foregoing, likewise, the circulation grooves 10 allows the lubricating oil to be maintained at an equal pressure in the vicinities of the thrust bearing portion T and the seal space S1, thereby making it possible to avoid lubricating oil leakage caused by air bubbles generated or a harmful effect such as abnormal abrasion of the thrust plate 6 which may be caused by the axial member 4 being pushed against the bottom portion 2c of the housing.

Figure 15:
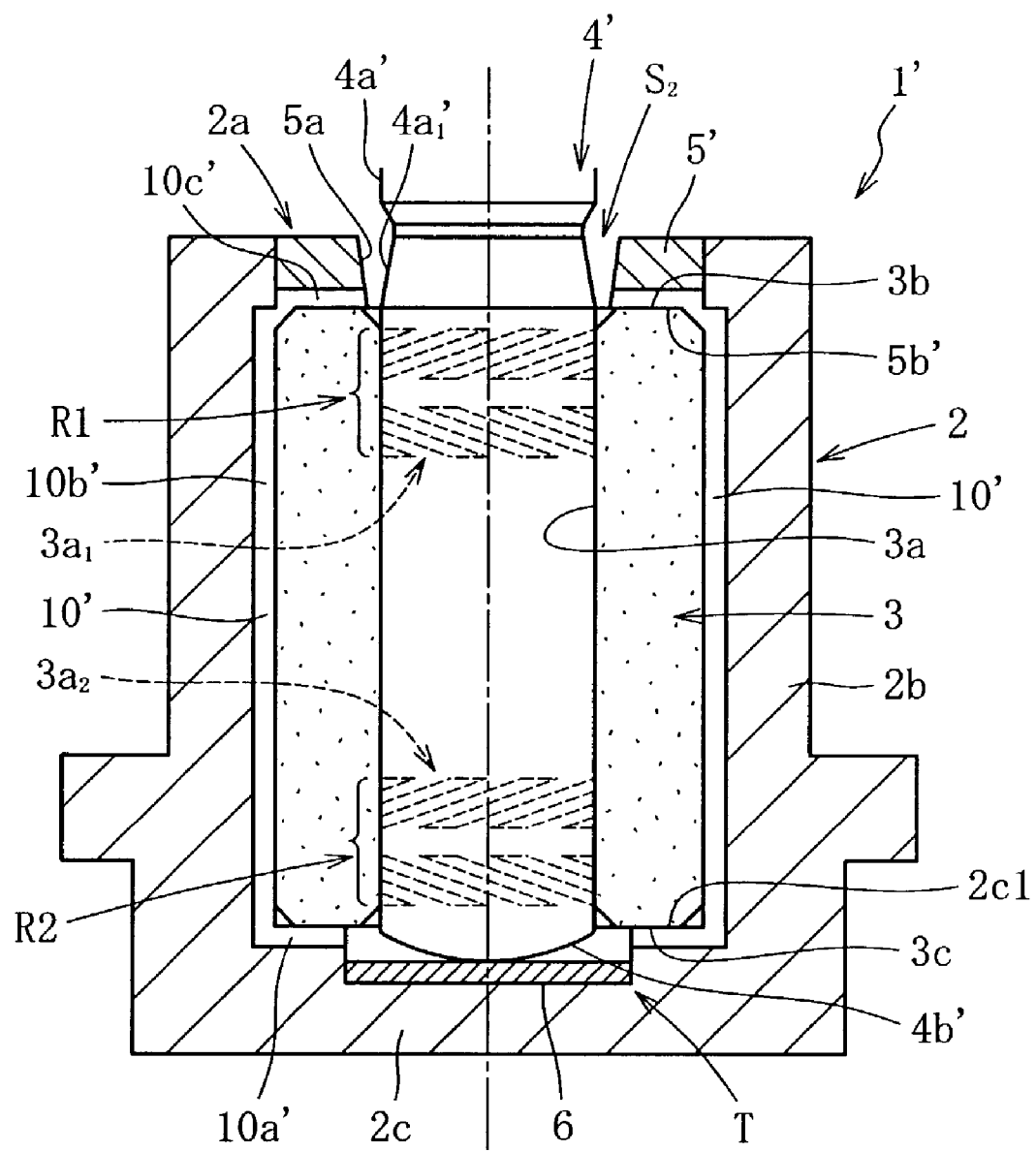
FIG. 15 is a cross-sectional view illustrating a fluid lubricated bearing device with circulation grooves according to another embodiment.

FIG. 15 illustrates an embodiment in which circulation grooves 10' are formed on members opposite to the bearing member 3 (the housing 2 and the seal member 5). That is, the first radial groove 10a' is formed on the inner face 2c1 of the bottom portion 2c of the housing, the second radial groove 10c' is formed on the lower end face 5b' of the seal member 5, and the axial groove 10b' is formed on the inner peripheral surface of the side portion 2b of the housing. The circulation grooves 10' can provide the same effects as the embodiment shown in FIG. 14.

FIG. 14 illustrates the cylindrical seal space S1 and FIG. 15 illustrates the tapered seal space S2. However, a seal space is not limited to one having a particular shape. Thus, on the contrary to theses examples, the tapered seal space S2 can be employed in the embodiment of FIG. 14 while the cylindrical seal space S1 can be employed in the embodiment of FIG. 15.

EXAMPLE

Bearing devices of five types to be tested (examples 1 to 2 and comparative examples 1 to 3) were fabricated by loading a lubricating oil in the aforementioned manner (by vacuum pressure impregnation) into the fluid lubricated bearing devices 1, configured as shown in FIG. 1, with the vacuum chamber being kept at different levels of vacuum to thereby have different amounts of air remaining in the inner space of the housing 2 after exposed to the atmospheric pressure. It is difficult to measure the amount of air remaining in the inner space of the housing after the lubricating oil has been loaded therein by vacuum pressure impregnation. However, for example, it can be estimated that air of 50 vol % of the inner space volume remains inside the housing after exposed to the atmospheric pressure when the vacuum chamber is reduced in pressure to 380 Torr (half the atmospheric pressure). This approach was used to estimate the amount of air remaining in the housing inner space.

Each of the aforementioned test bearing devices was tested to check for lubricating oil leakage when left under an environment of a reduced pressure (the reduced-pressure test) and when incorporated into an actual motor to operate being turned ON and OFF at various operating positions under the atmospheric pressure (the motor test). The results of the tests are shown in FIG. 16 (the reduced-pressure test) and FIG. 17 (the motor test). The test conditions are as follows.

Reduced-Pressure Test
  Degree of vacuum: 100 Torr

Motor Test
  Motor used: CD-ROM motor for actual use
  Rotational speed: 8000 rpm
  Ambient temperature: 60° C.
  Motor attitude: Normal, Horizontal, Inverted
  Running condition: ON-OFF (30 seconds per cycle)
  Test time: 300,000 cycles According to the reduced-pressure test, since different amounts of air remained in the inner space of the housing were dependent on the degree of vacuum of the vacuum chamber, some test bearing devices leaked lubricating oil under reduced pressures even though having had undergone vacuum pressure impregnation (comparative examples 1 to 3).

According to the motor test, those test bearing devices whose lubricating oil was loaded in drops (comparative examples 2 and 3) leaked lubricating oil during 50,000 to 200,000 cycles at the horizontal and inverted positions. On the other hand, those test bearing devices having undergone vacuum pressure impregnation (examples 1 and 2, and comparative example 1) leaked no lubricating oil up to 300,000 cycles at any position.

Thus, by loading the lubricating oil so as not to leak it even under a reduced pressure of 100 Torr as in the examples, it is possible to provide a fluid lubricated bearing device that can be operated and transported in a stable state without lubricating oil leakage even in any potential operational attitude or any environmental condition.

Figure 5:
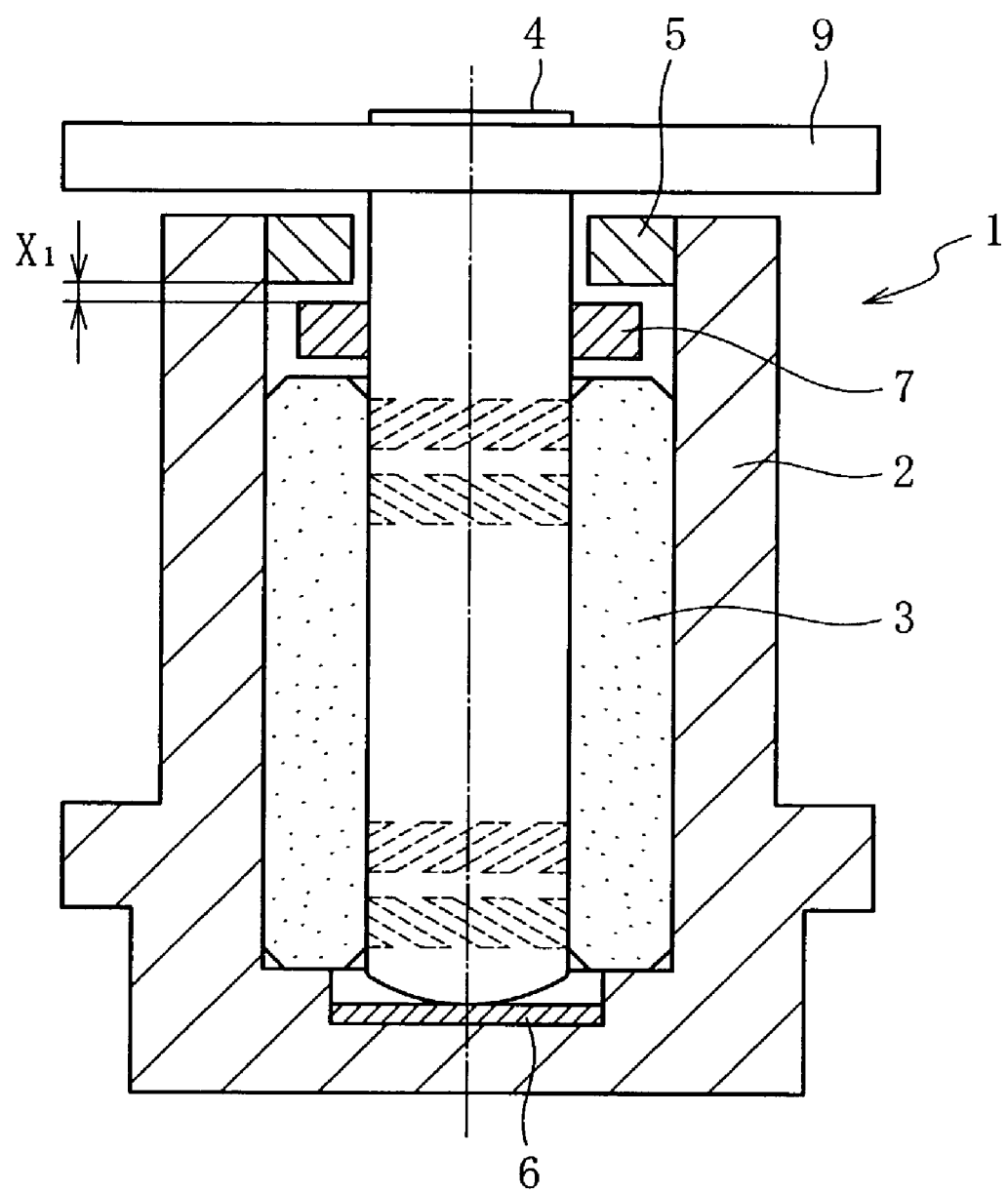
FIG. 5 is a cross-sectional view illustrating a hydrodynamic bearing device used for test.

On the other hand, with the configuration shown in FIG. 3, three types of fluid lubricated bearing devices 1 were fabricated which had an axial gap X1, between the washer 7 and the seal member 5, of 0.1 mm, 0.3 mm, and 0.5 mm, respectively. A dummy disk 9 equivalent to a practical load was placed over the axial member 4 of each of the fluid lubricated bearing devices 1 (see FIG. 5), which was in turn subjected to a drop impact test at 1000 G and then checked for lubricating oil leakage from inside of the housing 2. The drop impact of 1000 G was determined with reference to the property of resistance to impact load which is required of a spindle motor employed for recent portable-use apparatus such as an HDD device for use in notebook computers. Furthermore, the test was conducted on the conventional fluid lubricated bearing device shown in FIG. 7 under the same conditions as described above (comparative example 4). The test results are shown in FIG. 18.

As can be seen from the results shown in FIG. 18, during the application of an impact load of 1000 G, the axial member dislodged from the housing in the comparative example 4 (shaft dislodgement), whereas in the examples 3 to 5, no shaft dislodgement occurred and no lubricating oil leakage was observed.

Furthermore, the fluid lubricated bearing devices according to the aforementioned examples 3 to 5 and comparative example 4 were incorporated into an actual motor (a polygon scanner motor for use with a laser beam printer), respectively, and then operated under the following conditions to check for lubricating oil leakage from inside of the housing. The test results are shown in FIG. 19.

Figure 6:
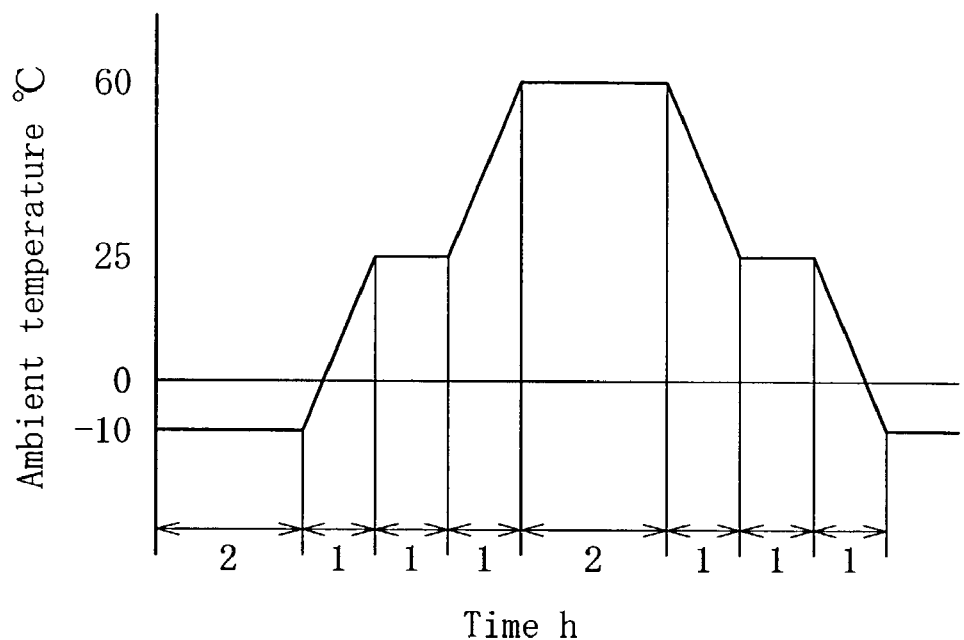
FIG. 6 is view illustrating a heat cycle pattern.

Running Conditions
  Actual motor: Polygon scanner motor for LBP
  Rotational speed: 30,000 rpm
  Heat cycle pattern: See FIG. 6
  Test time: 20 cycles
  Motor attitude: Horizontal and inverted As can be seen from the test results shown in FIG. 19, during operation in heat cycles, lubricating oil leakage was observed in the comparative example 4, whereas no lubricating oil leakage was observed at any of the horizontal and inverted attitudes in the examples 3 to 5.

As is obvious from the foregoing, the present invention provides the following effects.

(1) The inner space of the housing is filled with the lubricating oil to such a level as not to cause leakage of the lubricating oil outside thereof even in the present of expansion and contraction of air remaining in the inner space of the housing under environments of reduced pressures, particularly, from the atmospheric pressure to a pressure of 100 Torr. This prevents leakage of the lubricating oil from inside to outside of the housing and thereby allows stable operation and transportation of the fluid lubricated bearing device at any attitude such as normal, inverted, or horizontal attitude under any environmental conditions, conceivable as the environments for operation and transportation of the motor incorporating the fluid lubricated bearing device, such as high and low temperature environments or reduced pressure environments such as during operations at high altitudes or transportation by airfreight.

(2) The inner space of the housing is filled with the lubricating oil without air involved therein, thereby making it possible to prevent lubricating oil leakage or cavitation caused by ingestion of air.

(3) The axial member is provided with a projected portion in contact with the seal member to restrict the axial movement of the axial member relative to the housing towards one end thereof, thereby allowing the axial member to be always retained within the housing and prevented from being dislodged from the housing.

(4) An axial gap of 0.05 mm to 0.5 mm is defined between the projected portion and the seal member, thereby making it possible to provide stable operation without the projected portion in contact with the seal member. At the same time, it is also possible to prevent ingestion of air into the housing or lubricating oil leakage from inside of the housing even when the axial member moves axially within the range of the axial gap relative to the housing.

(5) A seal space, tapered so as to gradually expand towards one end, is provided between the inner peripheral surface of the seal member and the outer peripheral surface of the axial member opposite thereto, thereby providing improved sealing function to prevent lubricating oil leakage more effectively.

(6) Circulation grooves are provided to communicate the thrust bearing portion with the seal space, thereby equalizing the pressures in the thrust bearing portion and the seal space even in the presence of a difference in pressure of the lubricating oil between the thrust bearing portion and the seal space. This makes it possible to prevent detrimental effects such as generation of air bubbles, lubricating oil leakage, lifting of the shaft, and abnormal wear of the thrust plate.

Figure 20:
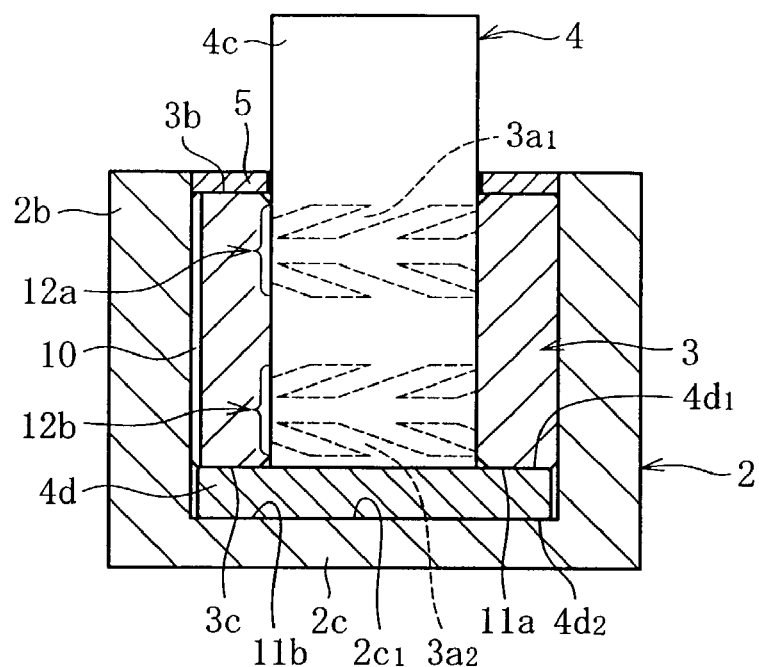
FIG. 20 is a longitudinal sectional view illustrating a hydrodynamic bearing device according to the present invention.

FIG. 20 illustrates a hydrodynamic bearing device according to another embodiment. The hydrodynamic bearing device according to this embodiment mainly consists of a sleeve-shaped bearing member 3, an axial member 4, and a bottomed housing 2 cylindrical in shape.

The bearing member 3 is formed of sintered meal impregnated with a lubricating oil or a lubricating grease to fill fine pores inside the sintered metal with oil.

For example, the sintered metal is mainly composed of copper, iron, or both, preferably with 20 to 95% of copper. As in the prior art, the bearing member 3 is fabricated through the processes of powder pressure molding, sintering, sizing, and impregnation of oil. The bearing member 3 obtained through those processes is provided by means of stamping or the like, on its inner peripheral surface and one end face 3c, with grooves 3a1 and 3a2 for generating dynamic pressure (dynamic pressure generating grooves), described later.

On the inner periphery of the bearing member 3, there are formed radial bearing surfaces 12a and 12b that have a plurality of dynamic pressure generating grooves 3a1 and 3a2 as dynamic pressure generating means. In the illustrated example, two radial bearing surfaces 12a and 12b are axially spaced apart from each other. However, the number of the radial bearing surfaces 12a, 12b is not limited to two but may be one, or three or more. The dynamic pressure generating grooves 3a1 and 3a2 of the radial bearing surfaces 12a and 12b are good enough if they are tilted at angles relative to the shaft, and may be arranged in herringbone patterns as illustrated or in a spiral fashion. On the other hand, it is also possible to employ a non-complete-round radial bearing surface, which has no dynamic pressure generating grooves, having a harmonic waveform or the like.

The axial member 4, formed of metal such as stainless steel, consists of a straight axial portion 4c and a disk-shaped flange portion 4d provided at an end of the axial portion 4c. The axial portion 4c and the flange portion 4d may be formed separately by press fitting or integrally by means of forging or the like.

The housing 2, bottomed and formed cylindrically, has an opening at one end with the other end closed. The bearing member 3 is secured to the inner periphery of the housing 2 by press fitting or with an adhesive or the like. At this time, the axial portion 4c of the axial member 4 is placed on the inner periphery of the bearing member 3 while the flange portion 4d is placed in the space between the bottom portion 2c of the housing 2 and the one end face 3c of the bearing member 3. As illustrated, the housing bottom portion 2c is integrated with the cylindrical side portion 2b or may be formed separately from the side portion 2b and then fit therein. The opening portion of the side portion 2b is sealed with the seal member 5 to prevent leakage of oil serving as a lubricating fluid. There is provided a slight axial gap between the seal member 5 and the end face 3b of the bearing member 3 opposite thereto in order to provide improved oil-retaining effects.

Under this condition, both end faces 4d1 and 4d2 of the flange portion 4d face to the one end face 3c of the bearing member 3 and a thrust carrying surface 9a1 of the housing bottom portion 2c, respectively. On the end face 3c of the bearing member 3 and the inner bottom face 2c1 of the housing bottom portion 2c, which face to the flange portion 4d, there are formed thrust bearing surfaces 11a and 11b that have a plurality of dynamic pressure generating grooves (not shown) as the dynamic pressure generating means, respectively. The dynamic pressure generating grooves of the thrust bearing surfaces 11a and 11b may be arbitrarily formed in shape. It is possible to form dynamic pressure generating grooves in the herringbone patterns as in the radial bearing surfaces 12a and 12b or in a spiral fashion as well as a stepped thrust bearing surface. The dynamic pressure generating grooves may be formed on both the end faces 4d1 and 4d2 of the flange portion 4d instead of the axial member end face 3c or the inner bottom face 2c1. In these cases, the aforementioned thrust bearing surface is formed on both the end faces 4d1 and 4d2 of the flange portion 4d.

There is an oil serving as a lubricating fluid filled in a fine gap (radial bearing gap) between the radial bearing surfaces 12a and 12b and the outer peripheral surface of the axial portion 4c and in a fine gap (thrust bearing gap) between the thrust bearing surfaces 11a and 11b and surfaces opposite thereto (the end faces 4d1 and 4d2 of the flange portion 4d in the illustrated example), respectively. During relative rotation between the axial member 4 and the bearing member 3 (rotation of the axial member 4 relative thereto in this embodiment), the operation of each of the radial bearing surfaces 12a, 12b, 11a, and 11b causes a dynamic pressure in the oil in the radial bearing gap and the thrust bearing gap, thereby providing non-contact support to the axial member 4 in both the radial and thrust directions relative to the bearing member 3.

Figure 21:
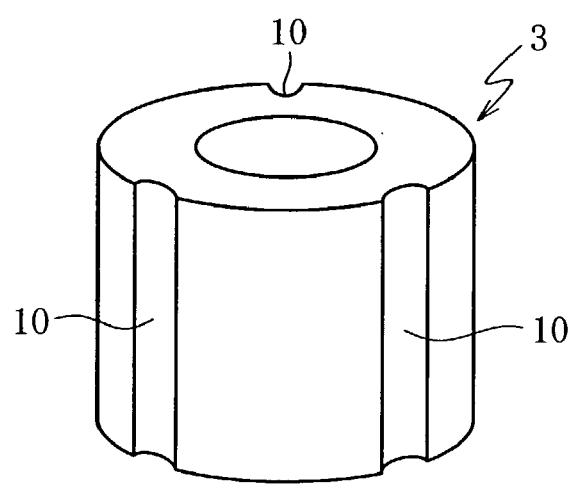
FIG. 21 is a perspective view illustrating a bearing member.

On the outer periphery of the bearing member 3, there are formed axial grooves having openings at their both end faces 3b and 3c or circulation grooves 10. The circulation grooves 10 communicate a sealed space defined between the bottom portion 2c of the housing 2 and the end face 3c of the bearing member 3 with outside of the bearing, serving as a passage for allowing the oil to flow axially. The oil in the circulation grooves 10 is absorbed by the bearing member 3, and exudes from the surface of the bearing member 3 to be supplied again to each bearing gap. Because of the reasons described later, the present invention provides circumferentially three or more, preferably three, circulation grooves 10 at equal intervals (see FIG. 21).

Figures 22, 23:
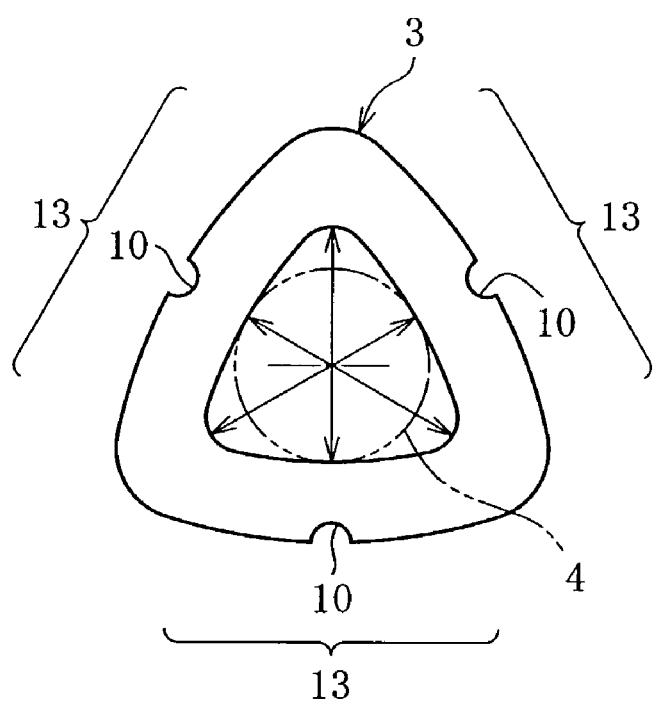
FIG. 22 is a view illustrating the non-dimensional rigidity of various bearings.
FIG. 23 is a cross-sectional view illustrating a three-arc segmented bearing.
Figure 24:
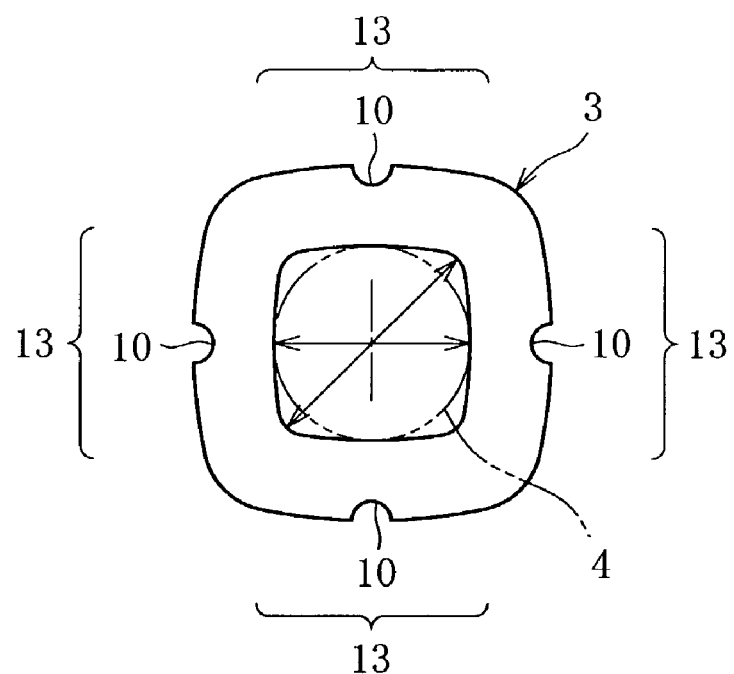
FIG. 24 is a cross-sectional view illustrating a four-arc segmented bearing.

When three circulation grooves 10 are formed in such a manner, as shown in FIG. 23, the bearing member 3 is deformed into a shape generally triangular in cross section with three circular segments 13 of an increased radius (a bearing member deformed in this manner is hereinafter referred to as a three-arc segmented bearing) after sizing due to the difference in the amount of spring-back between the circulation grooves 10 and other portions. On the other hand, when four circulation grooves 10 are formed, as shown in FIG. 24, the bearing member is deformed into a shape generally rectangular in cross section with four circular segments 13 of an increased radius (hereinafter referred to as a four-arc segmented bearing) after sizing for the same reason. Although not illustrated, in the cases where five or more circulation grooves 10 are provided, the bearing member is deformed into a shape generally polygonal in cross section with circular segments of an increased radius being the same in number as the circulation grooves 10 (a five-arc segmented bearing, six-arc segmented bearing and so forth). For simplicity, FIGS. 23 and 24 exaggerate the degree of deformation relative to a complete round; however, the deformations are not as distinct as illustrated to the human eyes.

FIG. 22 shows the results of non-dimensional rigidity analysis of an oil film from a two-arc segmented bearing, a three-arc segmented bearing, and a four-arc segmented bearing. These results were obtained by using a computer to numerically solve a second-order differential equation or the Reynolds equation by which the pressure of the fluid in the bearing gap was expressed. In the regions of negative pressures, Reynolds conditions were used as pressure boundary conditions. As used herein, the Reynolds conditions mean those that provide a pressure gradient of zero at discontinued portions of oil film and satisfy the continuity of flow.

Figure 25:
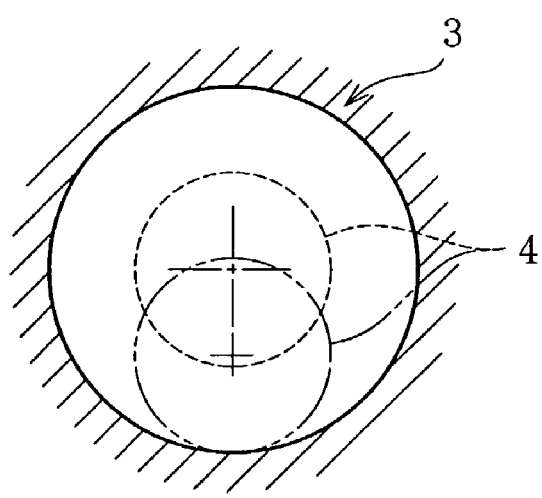
FIG. 25 is an explanatory view illustrating eccentricity.

The two-arc segmented bearing, the three-arc segmented bearing, and the four-arc segmented bearing described above are provided with two, three, and four circulation grooves 10 of a width of 10 degrees at equal intervals in the circumferential direction, respectively. Additionally, the ratio of the axial length L of the bearing member 3 to the outer diameter D (L/D) is set at 0.5 for all the bearings. Furthermore, the eccentricity $\epsilon$ of the axial member 4 is based on $\epsilon=0.1$ (however, $\epsilon=0.0868$ for the two-arc segmented bearing). As shown by a dashed line in FIG. 25, the centers of the bearing member 3 and the axial member 4 coincide with each other at $\epsilon=0$, while the axial member 4 is inscribed in the bearing member 3 at $\epsilon=1$, as shown by a chain double-dashed line in FIG. 25 (in which the width of the radial bearing gap is exaggerated).

Kxx, Kyy, Kxy, and Kyx represent the elastic constants of the oil film, each obtained by integrating a numerically determined distribution of pressure over the bearing surface and then numerically integrating the resulting x and y loads in the x- and y-directions, respectively. These constants are expressed in no dimensions, and dimensional rigidity kij is expressed by the following equation in which the four non-dimensional rigidities are expressed by Kij:

$$kij=(W/Cp)Kij$$

where W is the bearing load and Cp is the radial bearing gap.

A subscript "xx" represents X displacement causing a force in the X direction (in the direction of the minor axis of the ellipse), a subscript "yy" represents Y displacement causing a force in the Y direction (in the direction of the major axis of the ellipse), a subscript "xy" represents Y displacement causing a force in the X direction, and a subscript "yx" represents X displacement causing a force in the Y direction, respectively. Those with subscripts "xy" and "yx" are coupled items that show a force generated due to a displacement caused by movement of not itself but others, and with those items being greater, the axial member 4 provides more unstable runout. As can be seen from FIG. 22, the two-arc segmented bearing keeps no balance between the Kxx and Kyy and therefore has a big difference in bearing rigidity depending on the load direction, whereas the three-arc segmented bearing and the four-arc segmented bearing keep a balance therebetween and therefore has no such a disadvantage. From the foregoing, the number of the circulation grooves 10 should be preferably three or more so that the bearing member 3 approximates to the three-arc segmented bearing or the four-arc segmented bearing in cross section after spring-back.

On the other hand, consider how to control the radial bearing gap in mass production. The four-arc segmented bearing provides a big difference in inner diameter depending on the direction of measurement (see the arrows in FIG. 24), whereas the three-arc segmented bearing provides a small difference (see the arrows in FIG. 23). For this reason, when compared with the four-arc segmented bearing, the three-arc segmented bearing can have a higher tolerance on the inner diameter and thus can be fabricated at lower cost. According to FIG. 22, the three-arc segmented bearing is further preferable in that the three-arc segmented bearing has a smaller absolute value of the coupled items Kxy and Kyx. On the other hand, bearings with five-arc segments or more takes an approximately complete round in cross section after having deformed due to spring-back, thereby raising concerns that the axial member 4 will be subjected to unstable self-excited vibrations called whirling as well as increasing machining costs of the grooves. For the reasons described above, it is the most preferable to form three circulation grooves so that the bearing approximates to a three-arc segmented bearing in cross section after having been deformed due to spring-back.

Figure 8:
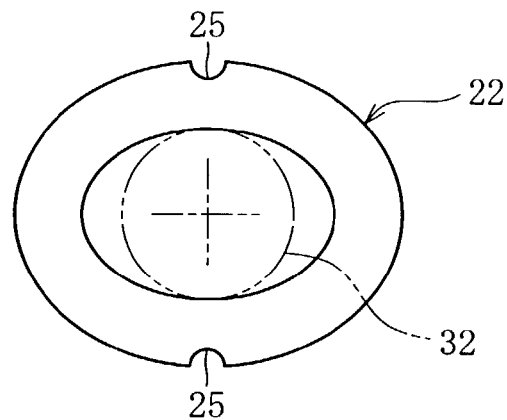
FIG. 8 is a cross-sectional view illustrating a two-arc segmented bearing.
Figure 26:
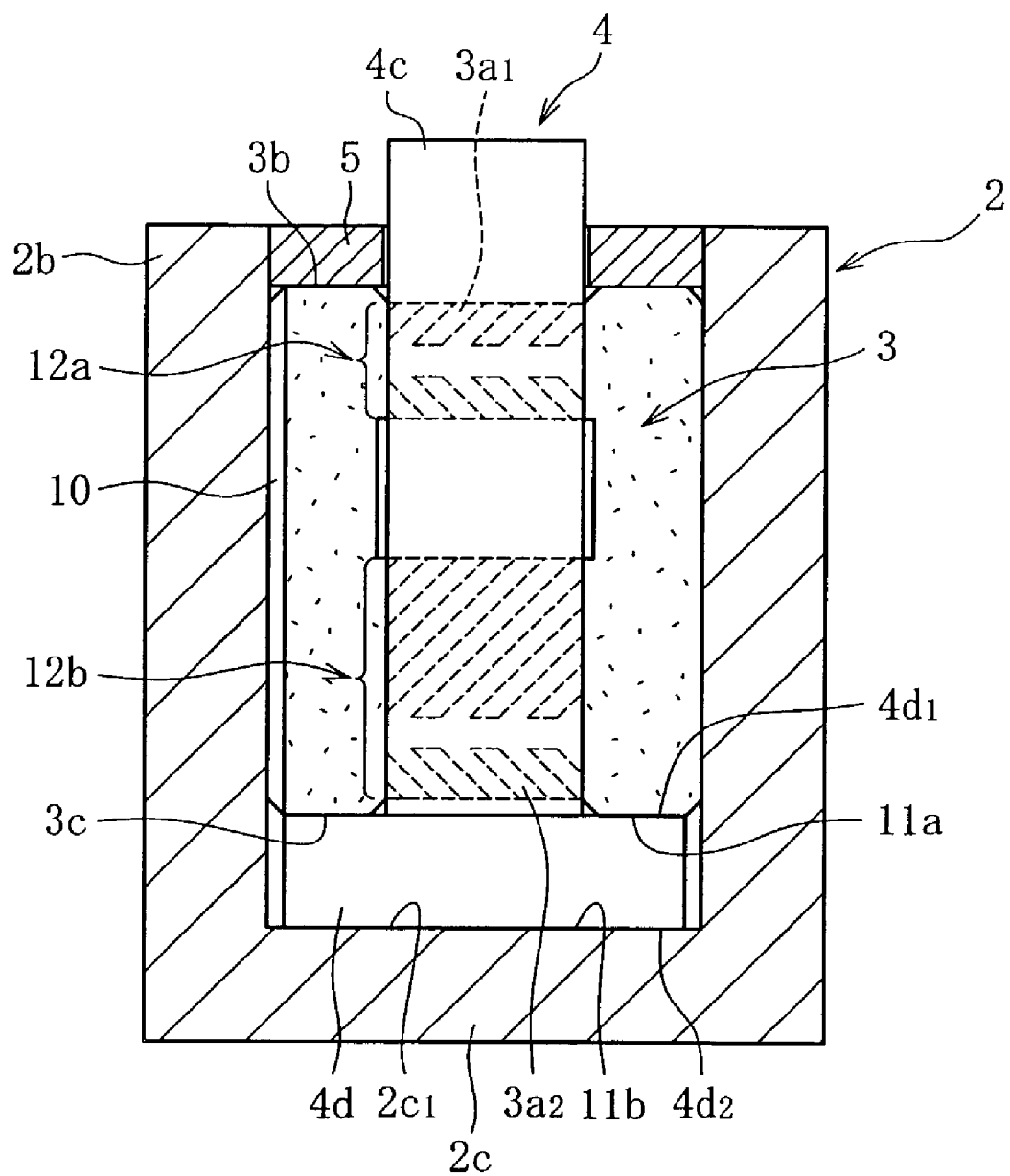
FIG. 26 is a longitudinal sectional view illustrating a dynamic bearing device in which an asymmetrical radial bearing surface is formed in the axial direction.

FIG. 26 illustrates a configuration in which the bearing surface 12b, of the two radial bearing surfaces 12a and 12b, closer to the bottom portion of the housing 2, is formed axially asymmetrically relative to the other bearing surface 12a to enhance the force for driving the oil towards the housing bottom portion through the dynamic pressure generating grooves 3a1 and 3a2. This may raise a concern that a displacement of a region having oil film formed therein toward the housing bottom portion causes an increased amount of oil to flow into the circulation grooves 10, thereby making it impossible to sufficiently accommodate the flow rate of the oil through conventional two circulation grooves (indicated by the reference numeral 25 in FIG. 8). However, three or more circulation grooves 10 can be provided as described above, thereby avoiding such a drawback. The number of the circulation grooves can be determined according to the flow of oil, however, it is the most preferable to form three or more circulation grooves 10 as described above in consideration of rotational accuracy.

According to the present invention, since three or more circulation grooves are formed on the outer periphery of the bearing member, it is possible to prevent the bearing rigidity from becoming unstable because of the bearing member deformed due to spring-back after sizing and thereby provide improved rotational accuracy for the bearing.

What is claimed is:

1. A fluid lubricated bearing device comprising:
    a housing with an opening portion provided on one end and a bottom portion provided on the other end;
    an axial member and a bearing member accommodated in the housing;
    a radial bearing portion, provided between an inner peripheral surface of the bearing member and an outer peripheral surface of the axial member, for allowing an oil film of a lubricating oil produced in a radial bearing gap to provide radial non-contact support to the axial member; and
    a seal member arranged in the opening portion of the housing, wherein a seal space is provided between the inner peripheral surface of the seal member and the outer peripheral surface of the axial member opposite thereto, and the seal space is tapered so as to gradually expand towards the one end of the housing,
    wherein an inner space of the housing is filled with the lubricating oil to such a level as not to cause leakage of the lubricating oil outside thereof even in the present of expansion or contraction of air remaining in the inner space of the housing under an environment of an atmospheric pressure to a pressure of 100 Torr.

2. The fluid lubricated bearing device according to claim 1, wherein the radial bearing portion is provided with dynamic pressure generating means for generating a dynamic pressure in the lubricating oil in the radial bearing gap.

3. A motor comprising the fluid lubricated bearing device according to claim 1.

* * * * *